United States Patent
Sánchez De La Fuente et al.

(10) Patent No.: US 12,244,865 B2
(45) Date of Patent: Mar. 4, 2025

(54) VIDEO DATA STREAM, VIDEO ENCODER, APPARATUS AND METHODS FOR HRD TIMING FIXES, AND FURTHER ADDITIONS FOR SCALABLE AND MERGEABLE BITSTREAMS

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 119 days.

(21) Appl. No.: 17/787,223

(22) PCT Filed: Dec. 18, 2020

(86) PCT No.: PCT/EP2020/087013
§ 371 (c)(1),
(2) Date: Jun. 17, 2022

(87) PCT Pub. No.: WO2021/123159
PCT Pub. Date: Jun. 24, 2021

(65) Prior Publication Data
US 2023/0037902 A1    Feb. 9, 2023

(30) Foreign Application Priority Data

Dec. 20, 2019 (EP) .................................. 19218926

(51) Int. Cl.
*H04N 19/70* (2014.01)
*H04N 19/15* (2014.01)
(Continued)

(52) U.S. Cl.
CPC ............. *H04N 19/70* (2014.11); *H04N 19/15* (2014.11); *H04N 19/172* (2014.11); *H04N 19/188* (2014.11); *H04N 19/30* (2014.11)

(58) Field of Classification Search
CPC ...... H04N 19/70; H04N 19/15; H04N 19/172; H04N 19/188; H04N 19/30
(Continued)

(56) References Cited

U.S. PATENT DOCUMENTS

2015/0016547 A1   1/2015   Tabatabai et al.
2015/0103888 A1   4/2015   Chen et al.
(Continued)

OTHER PUBLICATIONS

Bross et al., "Versatile Video Coding Draft 7", Joint Video Experts Team (JVET) of ITU-T SG 16 WP 3 and ISO/IEC JTC 1/SC 29/WG 11, 16th Meeting, Geneva, CH, Oct. 1-11, 2019 (Year: 2019).*
(Continued)

*Primary Examiner* — Hesham K Abouzahra
(74) *Attorney, Agent, or Firm* — NIXON & VANDERHYE P.C.

(57) ABSTRACT

An electronic device for decoding a picture from a data stream is disclosed, the electronic device includes a processor. The processor configured to decode a first syntax element indicating a bit rate value and a second syntax element indicating a bit rate scale. The processor is also configured to determine a fraction of a reference level corresponding to a subpicture of the picture, using a subpicture level information (SLI) supplemental enhancement information (SEI) message. The processor is further configured to determine a bit rate of the subpicture based on the
(Continued)

fraction, the first syntax element, and the second syntax element.

17 Claims, 8 Drawing Sheets

(51) Int. Cl.
  *H04N 19/169* (2014.01)
  *H04N 19/172* (2014.01)
  *H04N 19/30* (2014.01)
(58) Field of Classification Search
  USPC .................................................. 375/240.02
  See application file for complete search history.

(56) References Cited

U.S. PATENT DOCUMENTS

2015/0103926 A1    4/2015  Hannuksela
2017/0150160 A1*  5/2017  Deshpande ............ H04N 19/70

OTHER PUBLICATIONS

Bross et al.,"Versatile Video Coding Draft 7", Joint Video Experts Team (JVET) of ITU-T SG 16 WP 3 and ISO/IEC JTC1/SC 29/WG 11,16th Meeting, Geneva, CH, Oct. 1-11, 2019 (Year:2019) (Year: 2019).*

International Search Report for PCT/EP2020/087013 dated Feb. 18, 2021, 5 pages.
Written Opinion of the ISA for PCT/EP2020/087013 dated Feb. 18, 2021, 9 pages.
"Draft new Recommendation ITU-T H.266 (ex H.VVC) Versatile video coding;TD-PLEN-0445", ITU-T Draft; Study Period 2017-2020; Study Group 16; Series TD-PLEN-0445, International Telecommunication Union, Geneva ;CH vol. ties/16 Jul. 3, 2020 (Jul. 3, 2020), pp. 1-517, XP044292688, Retrieved from the Internet: URL:https://www.itu.int/ifa/t/2017/sg16/docs/200622/td/ties/plen/T17-SG16-200622-TD-PLEN-0445!A 1 !MSW-E.docx [retrieved on Jul. 3, 2020].
Bross B et al.: "Versatile Video Coding Editorial Refinements on Draft 10", 132. MPEG Meeting; Oct. 12-16, 2020; Online; (Motion Picture Expert Group or ISO/IEC JTC1/SC29/WG11 ), No. m55625 Nov. 24, 2020 (Nov. 24, 2020), XP030292215, Retrieved from the Internet: URL:https://dms.mpeg.expert/doc_end_user/documents/ 132_Teleconference/wg11 /m55625-JVET-T2001-v2-JVET-T2001-v2.zip JVET-T2001-v2.docx [retrieved on Nov. 24, 2020].
Y-K Wang (Bytedance) et al.: "AHG9: On the subpicture level information SEI message", 131. MPEG Meeting; Jun. 29, 2020-Jul. 3, 2020; Online; (Motion Picture Expert Group or ISO/IEC JTC1/SC29/WG11 ), No. m54184 ; JVET-S0176 Jun. 10, 2020 (Jun. 10, 2020), XP030288384, Retrieved from the Internet: URL:http://phenix.int-evry.fr/mpeg/doc_end_user/documents/131_Teleconference/wg11 /m54184-JVET-S0176-v1-JVET-S0176-v1 .zip JVET-S0176-v1 .docx [retrieved on Jun. 10, 2020].

* cited by examiner

VIDEO DATA STREAM, VIDEO ENCODER, APPARATUS AND METHODS FOR HRD TIMING FIXES, AND FURTHER ADDITIONS FOR SCALABLE AND MERGEABLE BITSTREAMS

CROSS-REFERENCE TO RELATED APPLICATIONS

This application is the U.S. national phase of International Application No. PCT/EP2020/087013 filed Dec. 18, 2020 which designated the U.S. and claims priority to EP Patent Application No. 19218926.4 filed Dec. 20, 2019, the entire contents of each of which are hereby incorporated by reference.

The present invention relates to video encoding and video decoding and, in particular, to a video encoder, to a video decoder, to methods for encoding and decoding and to a video data stream for realizing advanced video coding concepts.

H.265/HEVC (HEVC=High Efficiency Video Coding) is a video codec which already provides tools for elevating or even enabling parallel processing at an encoder and/or at a decoder. For example, HEVC supports a sub-division of pictures into an array of tiles which are encoded independently from each other. Another concept supported by HEVC pertains to WPP, according to which CTU-rows or CTU-lines of the pictures may be processed in parallel from left to right, e.g. in stripes, provided that some minimum CTU offset is obeyed in the processing of consecutive CTU lines (CTU=coding tree unit). It would be favorable, however, to have a video codec at hand which supports parallel processing capabilities of video encoders and/or video decoders even more efficiently.

Typically, in video coding, a coding process of picture samples requires smaller partitions, where samples are divided into some rectangular areas for joint processing such as prediction or transform coding. Therefore, a picture is partitioned into blocks of a particular size that is constant during encoding of the video sequence. In H.264/AVC standard fixed-size blocks of 16×16 samples, so called macroblocks, are used (AVC=Advanced Video Coding).

In the state-of-the-art HEVC standard (see [1]), there are Coded Tree Blocks (CTB) or Coding Tree Units (CTU) of a maximum size of 64×64 samples. In the further description of HEVC, for such a kind of blocks, the more common term CTU is used.

CTUs are processed in raster scan order, starting with the top-left CTU, processing CTUs in the picture line-wise, down to the bottom-right CTU.

The coded CTU data is organized into a kind of container called slice. Originally, in former video coding standards, slice means a segment comprising one or more consecutive CTUs of a picture. Slices are employed for a segmentation of coded data. From another point of view, the complete picture can also be defined as one big segment and hence, historically, the term slice is still applied. Besides the coded picture samples, slices also comprise additional information related to the coding process of the slice itself which is placed into a so-called slice header.

According to the state-of-the-art, a VCL (video coding layer) also comprises techniques for fragmentation and spatial partitioning. Such partitioning may, e.g., be applied in video coding for various reasons, among which are processing load-balancing in parallelization, CTU size matching in network transmission, error-mitigation etc.

A bitstream as specified in video coding standards has HRD conformance associated information. This conformance consists of a hypothetical reference decoder (HRD) including a buffer model that assumes that NAL units enter a Coded Picture Buffer (CPB) before the decoder and are removed therefrom at a particular time ensuring that the CPB size is not exceeded (buffer overrun) or that the NAL units do not arrive later than when they need to be removed (buffer underrun). Further, the model consists of a Decoded Picture Buffer (DPB) out of which decoded pictures are output when they are no longer needed for prediction and whose size is likewise constrained in many implementations. The timing information for the HRD is conveyed in the bitstream through so-called SEI messages, in particular, the Buffering Period (BP) SEI message that defines certain timing information for a Buffering Period (multiple access units or AUs), Picture Timing (PT) SEI message that conveys timing information for a single associated AU, and the Decoding Unit Information (DUI) SEI message that conveys timing information for an associated subset of an AU, namely a decoding unit or DU.

A bitstream as specified in video coding standards has HRD (Hypothetical Reference Decoder) conformance associated information. This conformance consists of a hypothetical buffer model that assumes that NAL units enter a Coded Picture Buffer (CPB) and are removed therefrom at a particular time ensuring that the CPB size is not exceeded (buffer overrun) or that the NAL units do not arrive later than when they need to be removed (buffer underrun).

When a bitstream is a scalable bitstream, pruning can be carried out to obtain a sub-bitstream that is also a conforming bitstream. For instance, when there is an Output Layer Set (OLS) containing 3 layers with resolution scalability (e.g., 480p base layer, 720p $1^{st}$ enhancement layer and 1080p $2^{nd}$ enhancement layer) referred to as $B_3$ hereafter, two sub-bitstreams can be obtained: one with two layers (480p and 720p) $B_2$ and another sub-bitstream with one layer (480p) $B_1$. Likewise, OLS can be used for temporal scalability, where $B_3$, $B_2$ and $B_1$ have the same resolution but different frame rates.

Obviously such bitstreams $B_3$, $B_2$ and $B_1$ have different HRD conformance as their required CPB size, Bitrate and timing information can be different.

Different CPB sizes and Bitrates are indicated in the VPS as a characteristic of the defined output layer sets (3 in the described example). Different timing information are provided by so-called Nesting SEI messages. Nesting SEI messages can contain nested Buffering Period SEIs and Picture Timing SEIs that apply to a sub-bitstream that can be obtain by bitstream pruning (bitstream extraction). Then when this operation (extraction or pruning is carried out), the Buffering Period SEI message and Picture Timing SEI message of e.g. the input bitstream $B_3$ are removed from the bitstream and also the NAL units belonging to the $2^{nd}$ enhancement layer. Besides, the Buffering Period SEI message and Picture Timing SEI message corresponding to the bitstream $B_2$ that are carried in the Nesting SEI message are placed at the bitstream out of the nesting SEI message substituting thus the removed ones.

The object of the present invention is to provide improved concepts for video encoding and video decoding.

The object of the present invention is solved by the subject-matter of the independent claims.

Preferred embodiments are provided in the dependent claims.

According to an embodiment, a video data stream having a video encoded thereinto is provided. The video data stream comprises an indication that indicates whether or not one or more scalable nesting supplemental enhancement information messages comprising timing information for each of one or more output layer sets are present within the video data stream.

Moreover, according to an embodiment, a video encoder for encoding a video into a video data stream, such that the video data stream has the video encoded thereinto, is provided. The video encoder is to generate the video data stream such that the video data stream comprises an indication that indicates whether or not one or more scalable nesting supplemental enhancement information messages comprising timing information for each of one or more output layer sets are present within the video data stream.

Furthermore, according to an embodiment, an apparatus for receiving a video data stream as an input bitstream, wherein the video data stream has a video encoded thereinto, is provided. The apparatus is to process the input bitstream to obtain a sub-bitstream. An indication indicates whether or not one or more scalable nesting supplemental enhancement information messages comprising timing information for each of one or more output layer sets are present within the video data stream.

Moreover, according to an embodiment, a method for encoding a video into a video data stream, such that the video data stream has the video encoded thereinto, is provided. The method comprises generating the video data stream such that the video data stream comprises an indication that indicates whether or not one or more scalable nesting supplemental enhancement information messages comprising timing information for each of one or more output layer sets are present within the video data stream.

Furthermore, according to an embodiment, a method for receiving a video data stream as an input bitstream, wherein the video data stream has a video encoded thereinto, is provided. The method comprises processing the input bitstream to obtain a sub-bitstream. The indication indicates whether or not one or more scalable nesting supplemental enhancement information messages comprising timing information for each of one or more output layer sets are present within the video data stream.

Moreover, computer programs for implementing one of the above-described methods when being executed on a computer or signal processor are provided.

Moreover, according to an embodiment, a video data stream having a video encoded thereinto, is provided. An indication within the video data stream indicates whether or not timing information for a sub-bitstream is to be obtained from one or more non-scalable-nested picture timing supplemental enhancement information messages of the video data stream.

Furthermore, according to an embodiment, a video data stream having a video encoded thereinto, is provided. A first indication within the video data stream indicates whether or not timing information for a sub-bitstream is to be obtained from the one or more non-scalable-nested buffering period supplemental enhancement information messages of the video data stream. And/or, a second indication within the video data stream indicates whether or not the timing information for the sub-bitstream is to be obtained from the one or more non-scalable-nested decoding unit supplemental enhancement information messages of the video data stream.

Moreover, according to an embodiment, a video data stream comprises one or more non-scalable-nested supplemental enhancement information messages comprising timing information, is provided. If the video data stream comprises a scalable nesting supplemental enhancement information message comprising the timing information, this indicates that depending on the scalable nesting supplemental enhancement information message: All of the one or more non-scalable-nested timing information supplemental enhancement information messages are to be substituted by the scalable nesting supplemental enhancement information message comprising the timing information (e.g., the timing information is picture timing information or buffering period information or decoding unit information). Or a subset comprising at least one of the one or more non-scalable-nested timing information enhancement information messages is to be substituted by the scalable nesting supplemental enhancement information message comprising the timing information (e.g., the timing information is the picture timing information or the buffering period information or the decoding unit information).

Furthermore, according to an embodiment, a video encoder for encoding a video into a video data stream, such that the video data stream has the video encoded thereinto, is provided. The video encoder is to generate the video data stream such that an indication within the video data stream indicates whether or not timing information for a sub-bitstream is to be obtained from one or more non-scalable-nested picture timing supplemental enhancement information messages of the video data stream.

Moreover, according to an embodiment, a video encoder for encoding a video into a video data stream, such that the video data stream has the video encoded thereinto, is provided. A first indication within the video data stream indicates whether or not timing information for a sub-bitstream is to be obtained from the one or more non-scalable-nested buffering period supplemental enhancement information messages of the video data stream. And/or, a second indication within the video data stream indicates whether or not the timing information for the sub-bitstream is to be obtained from the one or more non-scalable-nested decoding unit supplemental enhancement information messages of the video data stream.

Furthermore, according to an embodiment, a video encoder for encoding a video into a video data stream, such that the video data stream has the video encoded thereinto, is provided. The video encoder is to generate the video data stream such that the video data stream comprises one or more non-scalable-nested supplemental enhancement information messages comprising timing information. If the video data stream comprises a scalable nesting supplemental enhancement information message comprising the timing information, this indicates that depending on the scalable nesting supplemental enhancement information message: All of the one or more non-scalable-nested timing information supplemental enhancement information messages are to be substituted by the scalable nesting supplemental enhancement information message comprising the timing information (e.g., the timing information is picture timing information or buffering period information or decoding unit information). Or: a subset comprising at least one of the one or more non-scalable-nested timing information supplemental enhancement information messages is to be substituted by the scalable nesting supplemental enhancement information message comprising the timing information (e.g., the timing information is the picture timing information or the buffering period information or the decoding unit information).

Moreover, according to an embodiment, an apparatus for receiving a video data stream as an input bitstream, wherein the video data stream has a video encoded thereinto, is provided. The apparatus is to process the input bitstream to obtain a sub-bitstream. An indication within the video data stream indicates whether or not timing information for a sub-bitstream is to be obtained from one or more non-scalable-nested picture timing supplemental enhancement information messages of the video data stream.

Furthermore, according to an embodiment, an apparatus for receiving a video data stream as an input bitstream, wherein the video data stream has a video encoded thereinto, is provided. The apparatus is to process the input bitstream to obtain a sub-bitstream. A first indication within the video data stream indicates whether or not timing information for a sub-bitstream is to be obtained from one or more non-scalable-nested buffering period supplemental enhancement information messages of the video data stream. And/or, a second indication within the video data stream indicates whether or not the timing information for the sub-bitstream is to be obtained from one or more non-scalable-nested decoding unit supplemental enhancement information messages of the video data stream.

Moreover, according to an embodiment, an apparatus for receiving a video data stream as an input bitstream, wherein the video data stream has a video encoded thereinto, is provided. The apparatus is to process the input bitstream to obtain a sub-bitstream. The video data stream comprises one or more non-scalable-nested supplemental enhancement information messages comprising timing information. If the video data stream comprises a scalable nesting supplemental enhancement information message comprising the timing information, the apparatus is to substitute, depending on the scalable nesting supplemental enhancement information message: All of the one or more non-scalable-nested timing information supplemental enhancement information messages by the scalable nesting supplemental enhancement information message comprising the timing information (e.g., the timing information is picture timing information or buffering period information or decoding unit information). Or, a subset comprising at least one of the one or more non-scalable-nested timing information supplemental enhancement information messages by the scalable nesting supplemental enhancement information message comprising the timing information (e.g., the timing information is the picture timing information or the buffering period information or the decoding unit information).

Furthermore, according to an embodiment, a method for encoding a video into a video data stream, such that the video data stream has the video encoded thereinto, is provided. The method comprises generating the video data stream such that an indication within the video data stream indicates whether or not timing information for a sub-bitstream is to be obtained from one or more non-scalable-nested picture timing supplemental enhancement information messages of the video data stream.

Moreover, according to an embodiment, a method for receiving a video data stream as an input bitstream, wherein the video data stream has a video encoded thereinto, is provided. The method comprises processing the input bitstream to obtain a sub-bitstream. An indication within the video data stream indicates whether or not timing information for a sub-bitstream is to be obtained from one or more non-scalable-nested picture timing supplemental enhancement information messages of the video data stream.

Furthermore, according to an embodiment, a method for encoding a video into a video data stream, such that the video data stream has the video encoded thereinto, is provided. A first indication within the video data stream indicates whether or not timing information for a sub-bitstream is to be obtained from one or more non-scalable-nested buffering period supplemental enhancement information messages of the video data stream. And/or, a second indication within the video data stream indicates whether or not the timing information for the sub-bitstream is to be obtained from one or more non-scalable-nested decoding unit supplemental enhancement information messages of the video data stream.

Moreover, according to an embodiment, a method for receiving a video data stream as an input bitstream, wherein the video data stream has a video encoded thereinto, is provided. The method comprises processing the input bitstream to obtain a sub-bitstream. A first indication within the video data stream indicates whether or not timing information for a sub-bitstream is to be obtained from one or more non-scalable-nested buffering period supplemental enhancement information messages of the video data stream. And/or, a second indication within the video data stream indicates whether or not the timing information for the sub-bitstream is to be obtained from the one or more non-scalable-nested decoding unit supplemental enhancement information messages of the video data stream.

Furthermore, according to an embodiment, a method for encoding a video into a video data stream, such that the video data stream has the video encoded thereinto, is provided. The method comprises generating the video data stream such that the video data stream comprises one or more non-scalable-nested supplemental enhancement information messages comprising timing information. If the video data stream comprises a scalable nesting supplemental enhancement information message comprising the timing information, this indicates that at least one of the one or more non-scalable-nested picture timing supplemental enhancement information messages is to be substituted by the scalable nesting supplemental enhancement information message comprising the timing information.

Moreover, according to an embodiment, a method for receiving a video data stream as an input bitstream, wherein the video data stream has a video encoded thereinto, is provided. The method comprises processing the input bitstream to obtain a sub-bitstream. The video data stream comprises one or more non-scalable-nested supplemental enhancement information messages comprising timing information. If the video data stream comprises a scalable nesting supplemental enhancement information message comprising the timing information, the method comprises substituting at least one of the one or more non-scalable-nested picture timing supplemental enhancement information messages by the scalable nesting supplemental enhancement information message comprising the timing information.

Moreover, computer programs for implementing one of the above-described methods when being executed on a computer or signal processor are provided.

Moreover, according to an embodiment, a video data stream having a video encoded thereinto, is provided. The video data stream comprises a plurality of access units. For each access unit of the plurality of access units, if the access unit comprises two or more scalable nested supplemental enhancement information messages which comprise buffer period information and/or picture timing information for an output layer set, then the buffer period information and/or the picture timing information for the output layer set is equal in all of the two or more scalable nested supplemental enhancement information messages of the access unit.

Furthermore, according to an embodiment, a video data stream having a video encoded thereinto, is provided. The video data stream comprises a plurality of access units. For each access unit of the plurality of access units, if the access unit comprises two or more scalable nested supplemental enhancement information messages which comprise buffer period information and/or picture timing information for an output layer set, then the video data stream comprises an indication indicating whether or not the buffer period information and/or the picture timing information for the output layer set is equal in all of the two or more scalable nested supplemental enhancement information messages of the access unit.

Moreover, according to an embodiment, a video data stream having a video encoded thereinto, is provided. The video data stream comprises a plurality of access units. For each access unit of the plurality of access units, if the access unit comprises three or more scalable nested supplemental enhancement information messages which comprise buffer period information and/or picture timing information for an output layer set, then the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Furthermore, according to an embodiment, a video data stream having a video encoded thereinto, is provided. The video data stream comprises a plurality of access units. For each access unit of the plurality of access units, if the access unit comprises three or more scalable nested supplemental enhancement information messages which comprise buffer period information and/or picture timing information for an output layer set, then the video data stream comprises an indication indicating whether or not the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Furthermore, according to an embodiment, a video encoder for encoding a video into a video data stream, such that the video data stream has the video encoded thereinto, is provided. The video encoder is to generate the video data stream such that the video data stream comprises a plurality of access units. For each access unit of the plurality of access units, if the access unit comprises two or more scalable nested supplemental enhancement information messages which comprise buffer period information and/or picture timing information for an output layer set, then the video encoder is to generate the video data stream such that the video data stream comprises an indication indicating whether or not the buffer period information and/or the picture timing information for the output layer set is equal in all of the two or more scalable nested supplemental enhancement information messages of the access unit.

Moreover, according to an embodiment, a video encoder for encoding a video into a video data stream, such that the video data stream has the video encoded thereinto, is provided. The video encoder is to generate the video data stream such that the video data stream comprises a plurality of access units. For each access unit of the plurality of access units, if the access unit comprises three or more scalable nested supplemental enhancement information messages which comprise buffer period information and/or picture timing information for an output layer set, then the video encoder is to generate the video data stream such that the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Furthermore, according to an embodiment, a video encoder for encoding a video into a video data stream, such that the video data stream has the video encoded thereinto, is provided. The video encoder is to generate the video data stream such that the video data stream comprises a plurality of access units. For each access unit of the plurality of access units, if the access unit comprises three or more scalable nested supplemental enhancement information messages which comprise buffer period information and/or picture timing information for an output layer set, then the video encoder is to generate the video data stream such that the video data stream comprises an indication indicating whether or not the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Furthermore, according to an embodiment, an apparatus for receiving a video data stream as an input bitstream, wherein the video data stream has a video encoded thereinto, is provided. The input bitstream comprises a plurality of access units. The apparatus is to process the access units of the input bitstream to obtain a sub-bitstream. For each access unit of the plurality of access units, if the access unit comprises two or more scalable nested supplemental enhancement information messages which comprise buffer period information and/or picture timing information for an output layer set, then the buffer period information and/or the picture timing information for the output layer set is equal in all of the two or more scalable nested supplemental enhancement information messages of the access unit.

Moreover, according to an embodiment, an apparatus for receiving a video data stream as an input bitstream, wherein the video data stream has a video encoded thereinto, is provided. The input bitstream comprises a plurality of access units. The apparatus is to process the access units of the input bitstream to obtain a sub-bitstream. For each access unit of the plurality of access units. If the access unit comprises two or more scalable nested supplemental enhancement information messages which comprise buffer period information and/or picture timing information for an output layer set, then the video data stream comprises an indication indicating whether or not the buffer period information and/or the picture timing information for the output layer set is equal in all of the two or more scalable nested supplemental enhancement information messages of the access unit.

Furthermore, according to an embodiment, an apparatus for receiving a video data stream as an input bitstream, wherein the video data stream has a video encoded thereinto, is provided. The input bitstream comprises a plurality of access units, the apparatus is to process the access units of the input bitstream to obtain a sub-bitstream. For each access unit of the plurality of access units, if the access unit comprises three or more scalable nested supplemental enhancement information messages which comprise buffer period information and/or picture timing information for an output layer set, then the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Moreover, according to an embodiment, an apparatus for receiving a video data stream as an input bitstream, wherein the video data stream has a video encoded thereinto, is provided. The input bitstream comprises a plurality of access units. The apparatus is to process the access units of the input bitstream to obtain a sub-bitstream. For each access unit of the plurality of access units, if the access unit comprises three or more scalable nested supplemental enhancement information messages which comprise buffer period information and/or picture timing information for an output layer set, then the video data stream comprises an indication indicating whether or not the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Moreover, according to an embodiment, a method for encoding a video into a video data stream, such that the video data stream has the video encoded thereinto, is provided. The method comprises generating the video data stream such that the video data stream comprises a plurality of access units. For each access unit of the plurality of access units, if the access unit comprises two or more scalable nested supplemental enhancement information messages which comprise buffer period information and/or picture timing information for an output layer set, then the method comprises generating the video data stream such that the buffer period information and/or the picture timing information for the output layer set is equal in all of the two or more scalable nested supplemental enhancement information messages of the access unit.

Furthermore, according to an embodiment, a method for encoding a video into a video data stream, such that the video data stream has the video encoded thereinto, is provided. The method comprises generating the video data stream such that the video data stream comprises a plurality of access units. For each access unit of the plurality of access units, if the access unit comprises two or more scalable nested supplemental enhancement information messages which comprise buffer period information and/or picture timing information for an output layer set, then the method comprises generating the video data stream such that the video data stream comprises an indication indicating whether or not the buffer period information and/or the picture timing information for the output layer set is equal in all of the two or more scalable nested supplemental enhancement information messages of the access unit.

Moreover, according to an embodiment, a method for encoding a video into a video data stream, such that the video data stream has the video encoded thereinto, is provided. The method comprises generating the video data stream such that the video data stream comprises a plurality of access units. For each access unit of the plurality of access units, if the access unit comprises three or more scalable nested supplemental enhancement information messages which comprise buffer period information and/or picture timing information for an output layer set, then the method comprises generating the video data stream such that the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Furthermore, according to an embodiment, a method for encoding a video into a video data stream, such that the video data stream has the video encoded thereinto, is provided. The method comprises generating the video data stream such that the video data stream comprises a plurality of access units. For each access unit of the plurality of access units, if the access unit comprises three or more scalable nested supplemental enhancement information messages which comprise buffer period information and/or picture timing information for an output layer set, then the method comprises generating the video data stream such that the video data stream comprises an indication indicating whether or not the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Moreover, according to an embodiment, a method for receiving a video data stream as an input bitstream, wherein the video data stream has a video encoded thereinto, is provided. The input bitstream comprises a plurality of access units. The method comprises processing the access units of the input bitstream to obtain a sub-bitstream. For each access unit of the plurality of access units, if the access unit comprises two or more scalable nested supplemental enhancement information messages which comprise buffer period information and/or picture timing information for an output layer set, then the buffer period information and/or the picture timing information for the output layer set is equal in all of the two or more scalable nested supplemental enhancement information messages of the access unit.

Furthermore, according to an embodiment, a method for receiving a video data stream as an input bitstream, wherein the video data stream has a video encoded thereinto, is provided. The input bitstream comprises a plurality of access units. The method comprises processing the access units of the input bitstream to obtain a sub-bitstream. For each access unit of the plurality of access units, if the access unit comprises two or more scalable nested supplemental enhancement information messages which comprise buffer period information and/or picture timing information for an output layer set, then the video data stream comprises an indication indicating whether or not the buffer period information and/or the picture timing information for the output layer set is equal in all of the two or more scalable nested supplemental enhancement information messages of the access unit.

Moreover, according to an embodiment, a method for receiving a video data stream as an input bitstream, wherein the video data stream has a video encoded thereinto, is provided. The input bitstream comprises a plurality of access units. The method comprises processing the access units of the input bitstream to obtain a sub-bitstream. For each access unit of the plurality of access units, if the access unit comprises three or more scalable nested supplemental enhancement information messages which comprise buffer period information and/or picture timing information for an output layer set, then the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Furthermore, according to an embodiment, a method for receiving a video data stream as an input bitstream, wherein the video data stream has a video encoded thereinto, is provided. The input bitstream comprises a plurality of access units. The method comprises processing the access units of the input bitstream to obtain a sub-bitstream. For each access unit of the plurality of access units, if the access unit comprises three or more scalable nested supplemental enhancement information messages which comprise buffer period information and/or picture timing information for an output layer set, then the video data stream comprises an indication indicating whether or not the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Moreover, computer programs for implementing one of the above-described methods when being executed on a computer or signal processor are provided.

Furthermore, according to an embodiment, a video data stream having a video encoded thereinto, is provided. The video data stream comprises a plurality of access units. The video data stream comprises a spread factor which depends on a number of sub-bitstreams of the video data stream; or the video data stream comprises a clock sub-tick value which depends on a highest sub-bitstream among the sub-bitstreams of the video data stream.

Moreover, according to an embodiment, a video encoder for encoding a video into a video data stream, such that the video data stream has the video encoded thereinto, is provided. The video encoder is to generate the video data stream such that the video data stream comprises a plurality of access units. Furthermore, the video encoder is to generate the video data stream such that the video data stream comprises a spread factor which depends on a number of sub-bitstreams of the video data stream; or the video encoder is to generate the video data stream such that the video data stream comprises a clock sub-tick value which depends on a highest sub-bitstream among the sub-bitstreams of the video data stream.

Furthermore, according to an embodiment, a video encoder for encoding a video into a video data stream, such that the video data stream has the video encoded thereinto, is provided. The video encoder is to generate the video data stream such that the video data stream comprises sub-layer specific frame rate information for a sub-layer; and/or the video encoder is to generate the video data stream such that the video data stream comprises sub-layer specific frame display duration information for the sub-layer.

Moreover, according to an embodiment, a video decoder for receiving a video data stream as an input bitstream, wherein the video data stream has a video encoded thereinto. The video data stream comprises a plurality of access units. The video decoder is to decode the video data stream to decode the video. The video data stream comprises a spread factor which depends on a number of sub-bitstreams of the video data stream, wherein the video decoder is to decode the video using the spread factor; or the video data stream comprises a clock sub-tick value which depends on a highest sub-bitstream among the sub-bitstreams of the video data stream, wherein the video decoder is to decode the video using the clock sub-tick value.

Furthermore, according to an embodiment, a video decoder for receiving a video data stream as an input bitstream, wherein the video data stream has a video encoded thereinto, is provided. The video decoder is to decode the video data stream to decode the video. The video data stream comprises sub-layer specific frame rate information for a sub-layer, and/or wherein the video data stream comprises sub-layer specific frame display duration information for the sub-layer. The decoder is to determine a spread factor using the sub-layer specific frame rate information for the sub-layer and/or using the sub-layer specific frame display duration information.

Furthermore, according to an embodiment, a method for encoding a video into a video data stream, such that the video data stream has the video encoded thereinto, is provided. The method comprises generating the video data stream such that the video data stream comprises a plurality of access units. Moreover, the method comprises generating the video data stream such that the video data stream comprises a spread factor which depends on a number of sub-bitstreams of the video data stream; or the method comprises generating the video data stream such that the video data stream comprises a clock sub-tick value which depends on a highest sub-bitstream among the sub-bitstreams of the video data stream.

Moreover, according to an embodiment, a method for receiving a video data stream as an input bitstream, wherein the video data stream has a video encoded thereinto. The video data stream comprises a plurality of access units. The method comprises decoding the video data stream to decode the video. The video data stream comprises a spread factor which depends on a number of sub-bitstreams of the video data stream, wherein the method comprises decoding the video using the spread factor; or the video data stream comprises a clock sub-tick value which depends on a highest sub-bitstream among the sub-bitstreams of the video data stream, wherein the method comprises decoding the video using the clock sub-tick value.

Furthermore, according to an embodiment, a method for receiving a video data stream as an input bitstream, wherein the video data stream has a video encoded thereinto. The method comprises decoding the video data stream to decode the video. The video data stream comprises sub-layer specific frame rate information for a sub-layer, and/or wherein the video data stream comprises sub-layer specific frame display duration information for the sub-layer. The method comprises determining a spread factor using the sub-layer specific frame rate information for the sub-layer and/or using the sub-layer specific frame display duration information.

Moreover, computer programs for implementing one of the above-described methods when being executed on a computer or signal processor are provided.

According to an embodiment, a video decoder for receiving a video data stream as an input bitstream, wherein the video data stream has a video encoded thereinto, is provided. The video decoder is to decode the video data stream to decode the video. To decode the video, the video decoder is to estimate a coded picture buffer size for a subpicture depending on information within the video data stream indicating a current coded picture buffer size information.

Moreover, according to an embodiment, a video decoder for receiving a video data stream as an input bitstream, wherein the video data stream has a video encoded thereinto, is provided. The video decoder is to decode the video data stream to decode the video. To decode the video, the video decoder is to estimate a bitrate for a subpicture depending on information within the video data stream indicating current coded video sequence bitrate information.

Furthermore, according to an embodiment, a video decoder for receiving a video data stream as an input bitstream, wherein the video data stream has a video encoded thereinto, is provided. The video decoder is to decode the video data stream to decode the video. To decode the video, the video decoder is to receive a coded picture buffer size for a subpicture being encoded within the video data stream, and is to use the coded picture buffer size for the subpicture to decode the video; and/or to decode the video, the video decoder is to receive a bitrate for a subpicture being encoded within the video data stream, and is to use the bitrate for the subpicture to decode the video.

Moreover, according to an embodiment, a video data stream having a video encoded thereinto, is provided. The video data stream comprises a syntax element cpb_size_value_minus1[i][j] and a syntax element cpb_size_scale. Or, the video data stream comprises a syntax element bit_rate_value_minus1[i][j] and a syntax element bit_rate_scale.

Furthermore, according to an embodiment, a video data stream having a video encoded thereinto, is provided. The video data stream comprises an indication indicating whether or not a coded picture buffer size for a subpicture shall be estimated using current coded picture buffer size information, and/or the video data stream comprises an indication indicating whether or not a bitrate for a subpicture shall be estimated using current coded video sequence bitrate information.

Moreover, according to an embodiment, a video data stream having a video encoded thereinto, is provided. The video data stream comprises an indication indicating whether or not a coded picture buffer size for a subpicture is encoded within the video data stream or whether the coded picture buffer size for the subpicture shall be estimated, and/or the video data stream comprises an indication indicating whether or not a bitrate for the subpicture is encoded within the video data stream or whether the bitrate for the subpicture shall be estimated.

Furthermore, according to an embodiment, a video encoder for encoding a video into a video data stream, such that the video data stream has the video encoded thereinto, is provided. The video encoder is to generate the video data stream such that the video data stream comprises a syntax element cpb_size_value_minus1[i][j] and a syntax element cpb_size_scale. Or, the video encoder is to generate the video data stream such that the video data stream comprises a syntax element bit_rate_value_minus1[i][j] and a syntax element bit_rate_scale.

Moreover, according to an embodiment, a video encoder for encoding a video into a video data stream, such that the video data stream has the video encoded thereinto, is provided. The video encoder is to generate the video data stream such that the video data stream comprises an indication indicating whether or not a coded picture buffer size for a subpicture shall be estimated using current coded picture buffer size information, and/or the video encoder is to generate the video data stream such that the video data stream comprises an indication indicating whether or not a bitrate for a subpicture shall be estimated using current coded video sequence bitrate information.

Furthermore, according to an embodiment, a video encoder for encoding a video into a video data stream, such that the video data stream has the video encoded thereinto, is provided. The video encoder is to generate the video data stream such that the video data stream comprises an indication indicating whether or not a coded picture buffer size for a subpicture is encoded within the video data stream or whether the coded picture buffer size for the subpicture shall be estimated, and/or the video encoder is to generate the video data stream such that the video data stream comprises an indication indicating whether or not a bitrate for the subpicture is encoded within the video data stream or whether the bitrate for the subpicture shall be estimated.

Moreover, according to an embodiment, a video encoder for encoding a video into a video data stream, such that the video data stream has the video encoded thereinto, is provided. The video encoder is to generate the video data stream such that, if the video data stream comprises common decoding unit removal timing information and a plurality of extractable sub-bitstreams, each of the plurality of sub-bitstreams being specific to an output layer set, each output layer set-specific hypothetical reference decoder parameter syntax structure in a video parameter set or in a sequence parameter set or in a supplemental enhancement information message of the video data stream comprises either a spread factor or an absolute value of a tick divisor for scaling the common decoding unit removal timings.

Furthermore, according to an embodiment, a method for receiving a video data stream as an input bitstream, wherein the video data stream has a video encoded thereinto, is provided. The method comprises decoding the video data stream to decode the video. To decode the video, the method comprises estimating a coded picture buffer size for a subpicture depending on information within the video data stream indicating a current coded picture buffer size information.

Moreover, according to an embodiment, a method for receiving a video data stream as an input bitstream, wherein the video data stream has a video encoded thereinto, is provided. The method comprises decoding the video data stream to decode the video. To decode the video, the method comprises estimating a bitrate for a subpicture depending on information within the video data stream indicating current coded video sequence bitrate information.

Furthermore, according to an embodiment, a method for receiving a video data stream as an input bitstream, wherein the video data stream has a video encoded thereinto, is provided. The method comprises decoding the video data stream to decode the video. To decode the video, the method comprises receiving a coded picture buffer size for a subpicture being encoded within the video data stream, and comprises using the coded picture buffer size for the subpicture to decode the video; and/or to decode the video, the method comprises receiving a bitrate for a subpicture being encoded within the video data stream, and comprises using the bitrate for the subpicture to decode the video.

Moreover, according to an embodiment, a method for encoding a video into a video data stream, such that the video data stream has the video encoded thereinto, is provided. The method comprises generating the video data stream such that the video data stream comprises a syntax element cpb_size_value_minus1 [i][j] and a syntax element cpb_size_scale; or, the method comprises generating the video data stream such that the video data stream comprises a syntax element bit_rate_value_minus1[i][j] and a syntax element bit_rate_scale.

Furthermore, according to an embodiment, a method for encoding a video into a video data stream, such that the video data stream has the video encoded thereinto, is provided. The method comprises generating the video data stream such that the video data stream comprises an indication indicating whether or not a coded picture buffer size for a subpicture shall be estimated using current coded picture buffer size information, and/or the method comprises generating the video data stream such that the video data stream comprises an indication indicating whether or not a bitrate for a subpicture shall be estimated using current coded video sequence bitrate information.

Moreover, according to an embodiment, a method for encoding a video into a video data stream, such that the video data stream has the video encoded thereinto, is provided. The method comprises generating the video data stream such that the video data stream comprises an indication indicating whether or not a coded picture buffer size for a subpicture is encoded within the video data stream or whether the coded picture buffer size for the subpicture shall be estimated, and/or the method comprises generating the video data stream such that the video data stream comprises an indication indicating whether or not a bitrate for the subpicture is encoded within the video data stream or whether the bitrate for the subpicture shall be estimated.

Furthermore, computer programs for implementing one of the above-described methods when being executed on a computer or signal processor are provided.

According to an embodiment, a video data stream having a video encoded thereinto, is provided. The video data stream comprises a plurality of access units. Furthermore, the video data stream comprises delta time information for each of two or more decoding units of an access unit of the plurality of access units, wherein a decoding unit removal time for each decoding unit of the two or more decoding units of said access unit depends on an access unit removal time for the access unit and depends on the delta time information for said decoding unit.

Moreover, according to an embodiment, a video encoder for encoding a video into a video data stream, such that the video data stream has the video encoded thereinto, is provided. The video encoder is to generate the video data stream such that the video data stream comprises a plurality of access units. Furthermore, the video encoder is to generate the video data stream such that the video data stream comprises delta time information for each of two or more decoding units of an access unit of the plurality of access units, wherein a decoding unit removal time for each decoding unit of the two or more decoding units of said access unit depends on an access unit removal time for the access unit and depends on the delta time information for said decoding unit.

Furthermore, according to an embodiment, a video decoder for receiving a video data stream as an input bitstream, wherein the video data stream has a video encoded thereinto, is provided. The video data stream comprises a plurality of access units. The video decoder is to decode the video data stream to decode the video. Moreover, the video data stream comprises delta time information for each of two or more decoding units of an access unit of the plurality of access units, wherein a decoding unit removal time for each decoding unit of the two or more decoding units of said access unit depends on an access unit removal time for the access unit and depends on the delta time information for said decoding unit, wherein the video decoder is to decode the video data stream using the delta time information for each of two or more decoding units of said access unit.

Moreover, according to an embodiment, a method for encoding a video into a video data stream, such that the video data stream has the video encoded thereinto, is provided. The method comprises generating the video data stream such that the video data stream comprises a plurality of access units. Moreover, the method comprises generating the video data stream such that the video data stream comprises delta time information for each of two or more decoding units of an access unit of the plurality of access units, wherein a decoding unit removal time for each decoding unit of the two or more decoding units of said access unit depends on an access unit removal time for the access unit and depends on the delta time information for said decoding unit.

Furthermore, according to an embodiment, a method for receiving a video data stream as an input bitstream, wherein the video data stream has a video encoded thereinto, is provided. The video data stream comprises a plurality of access units. The method comprises decoding the video data stream to decode the video. Furthermore, the video data stream comprises delta time information for each of two or more decoding units of an access unit of the plurality of access units, wherein a decoding unit removal time for each decoding unit of the two or more decoding units of said access unit depends on an access unit removal time for the access unit and depends on the delta time information for said decoding unit, wherein the method comprises decoding the video data stream using the delta time information for each of two or more decoding units of said access unit.

Moreover, computer programs for implementing one of the above-described methods when being executed on a computer or signal processor are provided.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 6 to FIG. 8. Thereinafter the description of embodiments of the concept of the present invention is presented along with a description as to how such concepts could be built into the encoder and decoder of FIG. 6 and FIG. 7, respectively, although the embodiments described with FIG. 1 to FIG. 3 and following, may also be used to form encoders and decoders not operating according to the coding framework underlying the encoder and decoder of FIG. 6 and FIG. 7.

Figure 6:
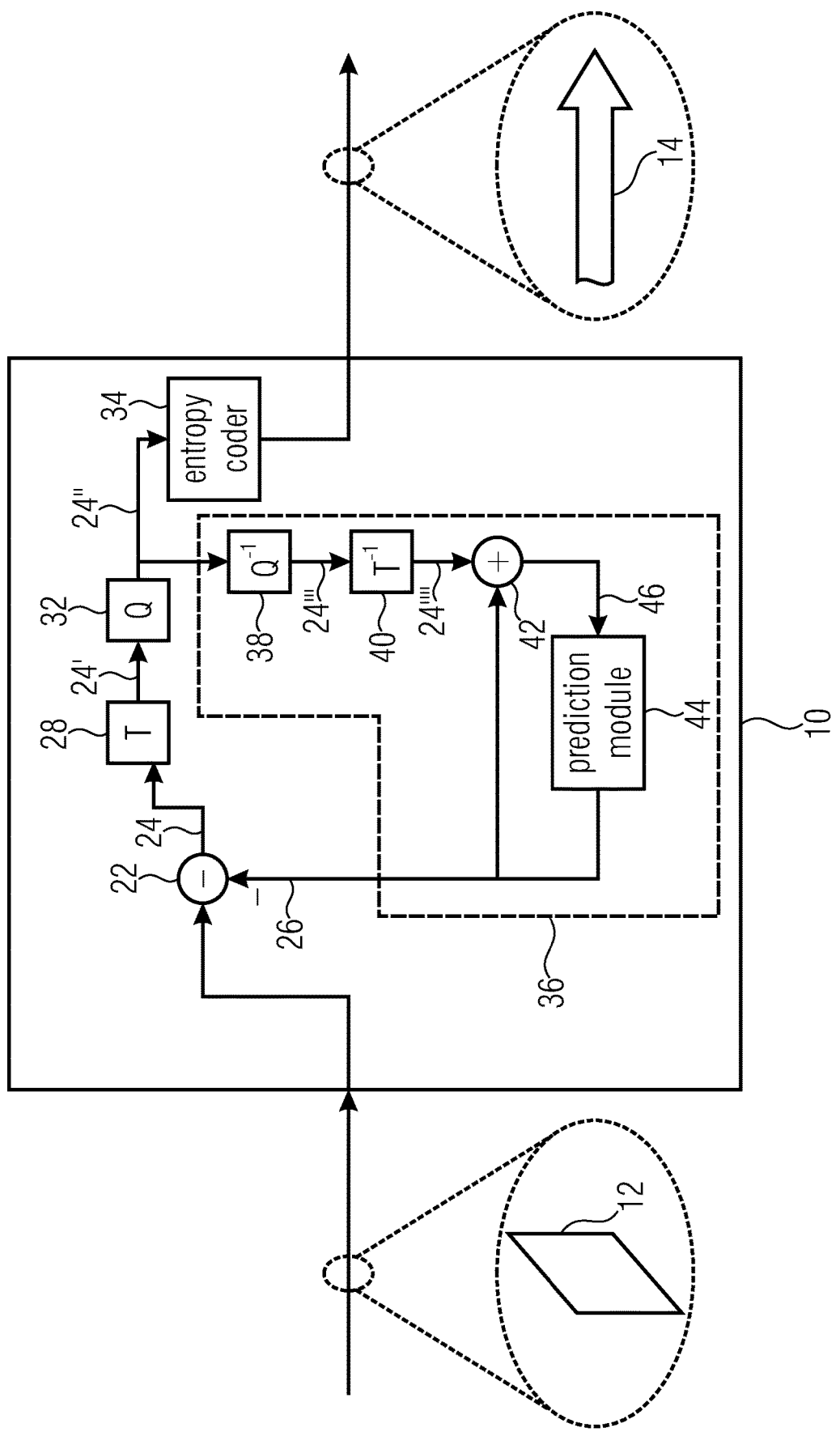
FIG. 6 illustrates a video encoder.
Figure 7:
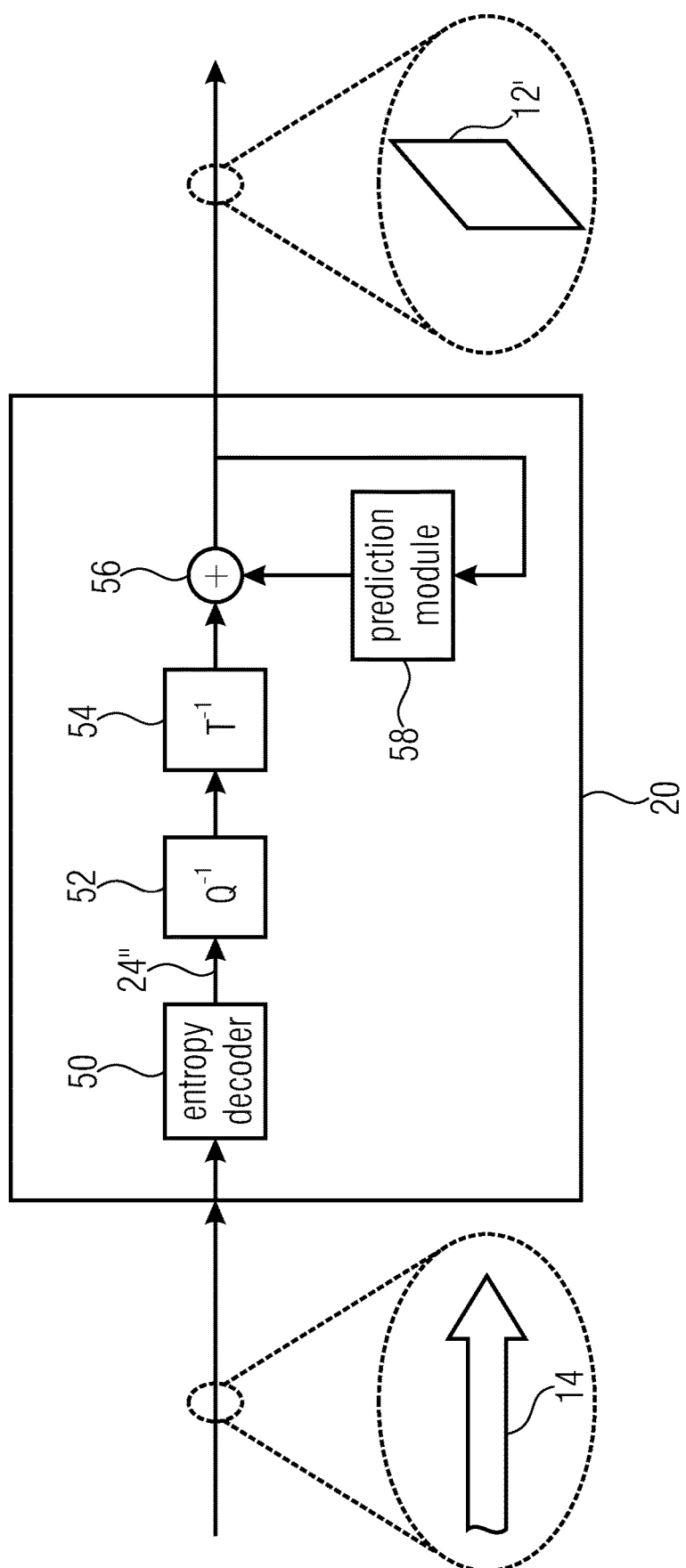
FIG. 7 illustrates a video decoder.

FIG. 6 shows a video encoder, an apparatus for predictively coding a picture 12 into a data stream 14 exemplarily using transform-based residual coding. The apparatus, or encoder, is indicated using reference sign 10. FIG. 7 shows a corresponding video decoder 20, e.g., an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 6 and FIG. 7 exemplarily use transform based prediction residual coding, although embodiments of the present application are not restricted to this kind of prediction residual coding. This is true for other details described with respect to FIG. 6 and FIG. 7, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, e.g., from the picture 12. The prediction residual signal former 22 may, for instance, be a subtractor which subtracts the prediction signal from the original signal, e.g., from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 6, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, e.g., a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, e.g., a reconstruction of the original signal 12. Reconstructed signal 46 may correspond to signal 12'. A prediction module 44 of prediction stage 36 then generates the prediction signal 26 on the basis of signal 46 by using, for instance, spatial prediction, e.g., intra-picture prediction, and/or temporal prediction, e.g., inter-picture prediction.

Likewise, decoder 20, as shown in FIG. 7, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 7, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, e.g., coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 8:
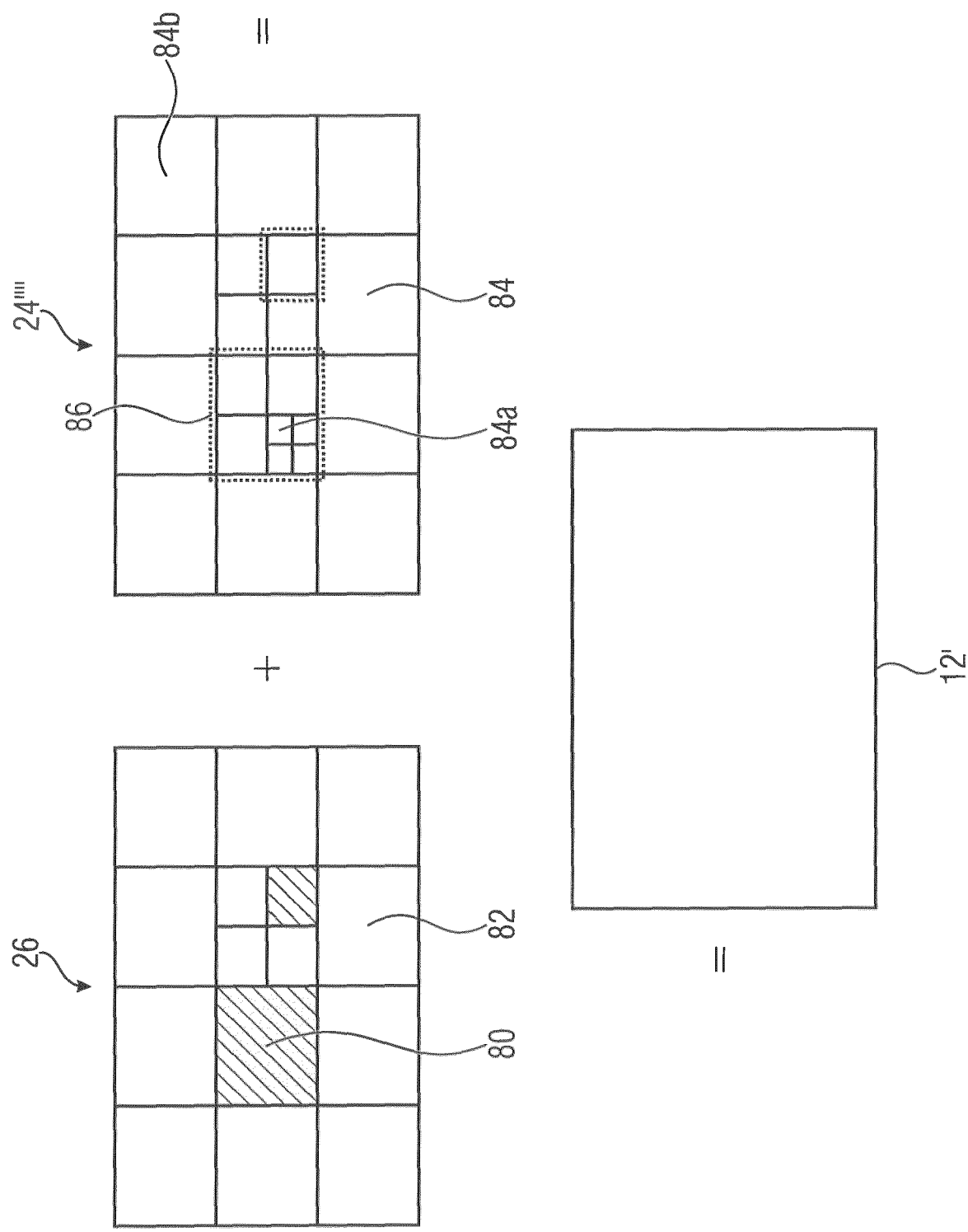
FIG. 8 illustrates the relationship between the reconstructed signal, e.g., the reconstructed picture, on the one hand, and the combination of the prediction residual signal as signaled in the data stream, and the prediction signal, on the other hand.

FIG. 8 illustrates the relationship between the reconstructed signal, e.g., the reconstructed picture 12', on the one hand, and the combination of the prediction residual signal 24"" as signaled in the data stream 14, and the prediction signal 26, on the other hand. As already denoted above, the combination may be an addition. The prediction signal 26 is illustrated in FIG. 8 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 8 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 8 is also illustrated as a subdivision of the picture area into blocks 84. These blocks might be called transform blocks in order to distinguish same from the coding blocks 80 and 82. In effect, FIG. 8 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, e.g., each coding block 80 and 82, may concurrently form a transform block 84, but FIG. 8 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, e.g., the blocks 84 may be the result of a regular subdivision of picture area into blocks (with or without arrangement into rows and columns), the result of a recursive multi-tree subdivisioning of the picture area, or a combination thereof or any other sort of blocka- tion. Just as an aside, it is noted that blocks 80, 82 and 84 are not restricted to being of quadratic, rectangular or any other shape.

FIG. 8 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 8, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 6 to FIG. 8 have been presented as an example where the inventive concept described further below may be implemented in order to form specific examples for encoders and decoders according to the present application. Insofar, the encoder and decoder of FIG. 6 and FIG. 7, respectively, may represent possible implementations of the encoders and decoders described herein below. FIG. 6 and FIG. 7 are, however, only examples. An encoder according to embodiments of the present application may, however, perform block-based encoding of a picture 12 using the concept outlined in more detail below and being different from the encoder of FIG. 6 such as, for instance, in that same is no video encoder, but a still picture encoder, in that same does not support inter-prediction, or in that the sub-division into blocks 80 is performed in a manner different than exemplified in FIG. 8. Likewise, decoders according to embodiments of the present application may perform block-based decoding of picture 12' from data stream 14 using the coding concept further outlined below, but may differ, for instance, from the decoder 20 of FIG. 7 in that same is no video decoder, but a still picture decoder, in that same does not support intra-prediction, or in that same sub-divides picture 12' into blocks in a manner different than described with respect to FIG. 8 and/or in that same does not derive the prediction residual from the data stream 14 in transform domain, but in spatial domain, for instance.

Figure 1:
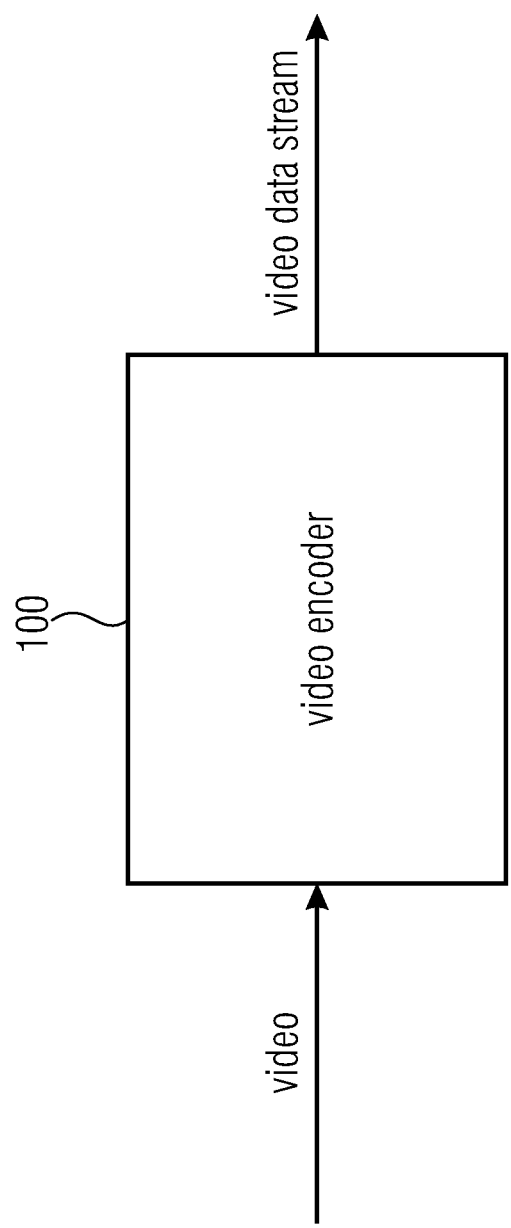
FIG. 1 illustrates a video encoder for encoding a video into a video data stream according to an embodiment.

FIG. 1 illustrates a video encoder 100 for encoding a video into a video data stream according to an embodiment. The video encoder 100 is configured to generate the video data stream.

Figure 2:
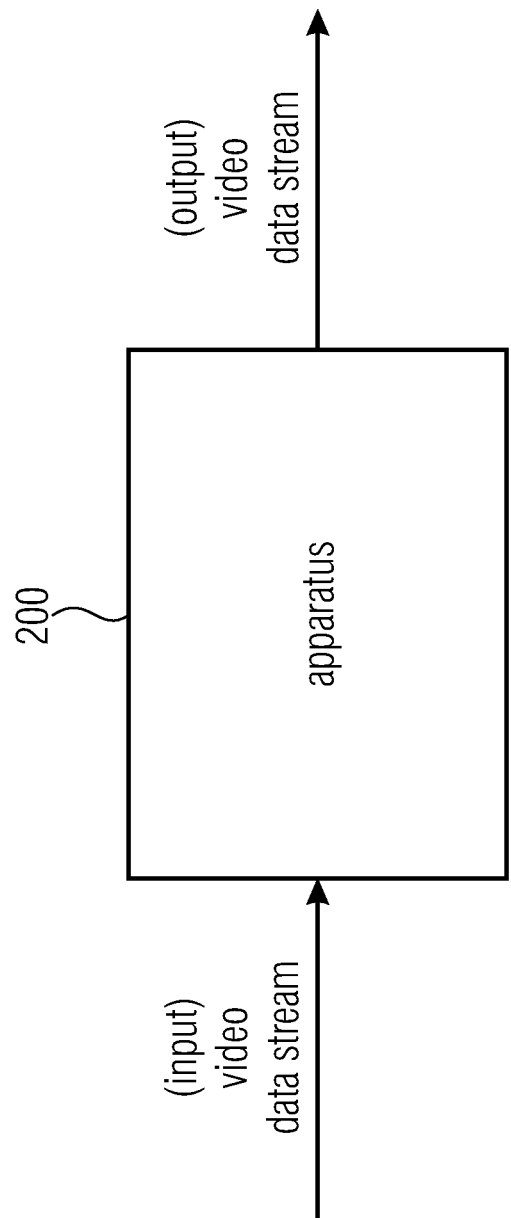
FIG. 2 illustrates an apparatus for receiving an input video data stream according to an embodiment.

FIG. 2 illustrates an apparatus 200 for receiving an input video data stream according to an embodiment. The input video data stream has a video encoded thereinto. The apparatus 200 is configured to generate an output video data stream from the input video data stream.

Figure 3:
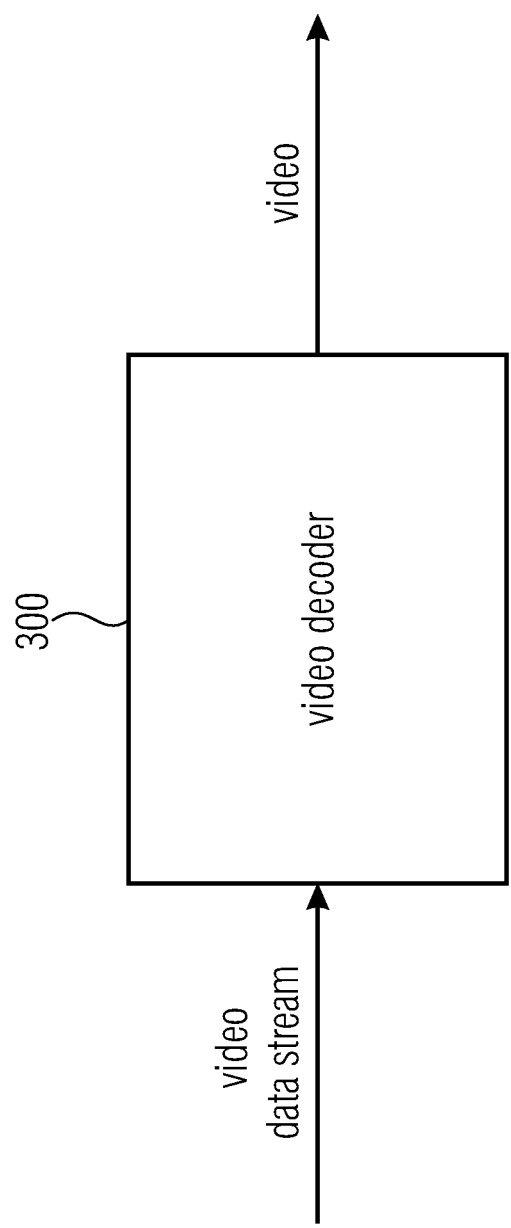
FIG. 3 illustrates a video decoder for receiving a video data stream having a video stored therein according to an embodiment.

FIG. 3 illustrates a video decoder 300 for receiving a video data stream having a video stored therein according to an embodiment. The video decoder 300 is configured to decode the video from the video data stream.

Moreover, a system according to an embodiment is provided. The system comprises the apparatus of FIG. 2 and the video decoder of FIG. 3. The video decoder (300) of FIG. 3 is configured to receive the output video data stream of the apparatus (200) of FIG. 2. The video decoder 300 of FIG. 3 is configured to decode the video from the output video data stream of the apparatus 200 of FIG. 2.

In an embodiment, the system may, e.g., further comprise a video encoder 100 of FIG. 1. The apparatus 200 of FIG. 2 may, e.g., be configured to receive the video data stream from the video encoder 100 of FIG. 1 as the input video data stream.

The (optional) intermediate device 210 of the apparatus 200 may, e.g., be configured to receive the video data stream from the video encoder 100 as an input video data stream and to generate an output video data stream from the input video data stream. For example, the intermediate device may, e.g., be configured to modify (header/meta data) information of the input video data stream and/or may, e.g., be configured to delete pictures from the input video data stream and/or may configured to mix/splice the input video data stream with an additional second bitstream having a second video encoded thereinto.

The (optional) video decoder 221 may, e.g., be configured to decode the video from the output video data stream.

The (optional) Hypothetical Reference Decoder 222 may, e.g., be configured to determine timing information for the video depending on the output video data stream, or may, e.g., be configured to determine buffer information for a buffer into which the video or a portion of the video is to be stored.

The system comprises the video encoder 101 of FIG. 1 and the video decoder 151 of FIG. 2.

The video encoder 101 is configured to generate the encoded video signal. The video decoder 151 is configured to decode the encoded video signal to reconstruct the picture of the video.

In the following, particular embodiments are described.

In HEVC, a note in the extraction process specification describes the handling of nested SEI messages as follows:

A "smart" bitstream extractor may include appropriate non-scalable-nested buffering picture SEI messages, non-scalable-nested picture timing SEI messages and non-scalable-nested decoding unit information SEI messages in the extracted sub-bitstream, provided that the SEI messages applicable to the sub-bitstream were present as scalable-nested SEI messages in the original bitstream.

In VVC, a envisioned design is properly to have the behaviour normatively specified, e.g. as follows with respect to the extraction process as defined in JVET-P2001-vC, wherein embodiments of the present invention have been added.

Sub-Bitstream Extraction Process

Inputs to this process are a bitstream inBitstream, a target OLS index targetOlsIdx, and a target highest TemporalId value tIdTarget.

Output of this process is a sub-bitstream outBitstream.

It is a requirement of bitstream conformance for the input bitstream that any output sub-bitstream that is the output of the process specified in this clause with the bitstream, targetOlsIdx equal to an index to the list of OLSs specified by the VPS, and tIdTarget equal to any value in the range of 0 to 6, inclusive, as inputs, and that satisfies the following conditions shall be a conforming bitstream:

The output sub-bitstream contains at least one VCL NAL unit with nuh_layer_id equal to each of the nuh_layer_id values in LayerIdInOls[targetOlsIdx].

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream OutBitstream is derived as follows:

The bitstream outBitstream is set to be identical to the bitstream inBitstream.

Remove from outBitstream all NAL units with TemporalId greater than tIdTarget.

Remove from outBitstream all NAL units with nal_unit_type not equal to any of VPS_NUT, DPS_NUT, and EOB_NUT and with nuh_layer_id not included in the list LayerIdInOls[targetOlsIdx].

Remove from outBitstream all SEI NAL units that contain a scalable nesting SEI message that has nesting_ols_flag equal to 1 and there is no value of i in the range of 0 to nesting_num_olss_minus1, inclusive, such that NestingOlsIdx[i] is equal to targetOlsIdx.

When targetOlsIdx is greater than 0, remove from outBitstream all SEI NAL units that contain a non-scalable-nested SEI message with payloadType equal to 0 (buffering period), 1 (picture timing), or 130 (decoding unit information).

According to particular embodiments:

When outBitstream contains SEI NAL units that contain a scalable nesting SEI message with nesting_ols_flag equal to 1 and that are applicable to outBitstream (NestingOlsIdx[i] is equal to targetOlsIdx), do the following:

Extract appropriate non-scalable-nested SEI message with payloadType equal to 0 (buffering period), 1 (picture timing), or 130 (decoding unit information) from the scalable nesting SEI message and put those messages into outBitstream.

Remove from outBitstream all SEI NAL units that contain a scalable nesting SEI message In the following, a Presence of scalable nesting SEI messages for OLS in the bitstream is described.

According to an embodiment, a video data stream having a video encoded thereinto is provided. The video data stream comprises an indication that indicates whether or not one or more scalable nesting supplemental enhancement information messages comprising timing information for each of one or more output layer sets are present within the video data stream.

In an embodiment, the indication is a parameter set flag. The video data stream may, e.g., comprise the parameter set flag that indicates whether or not the one or more scalable nesting supplemental enhancement information messages comprising timing information for each of the one or more output layer sets are present within the video data stream.

According to an embodiment, video data stream according to claim 2. A sequence parameter set of the video data stream may, e.g., comprise the parameter set flag.

In an embodiment, the parameter set flag is an sps_ols_nest_timing_present_flag.

According to an embodiment, the video data stream may, e.g., comprise a further supplemental enhancement information message which may, e.g., comprise a parameter set flag. The parameter set flag indicates whether or not the one or more scalable nesting supplemental enhancement information messages for each of the one or more output layer sets are present within the video data stream.

In an embodiment, the timing information may, e.g., comprise at least one of picture timing information and buffering period information and decoding unit information.

According to an embodiment, the timing information is timing information for a Hypothetical Reference Decoder.

Moreover, according to an embodiment, a video encoder for encoding a video into a video data stream, such that the video data stream has the video encoded thereinto, is provided. The video encoder is to generate the video data stream such that the video data stream comprises an indication that indicates whether or not one or more scalable nesting supplemental enhancement information messages comprising timing information for each of one or more output layer sets are present within the video data stream.

According to an embodiment, the indication is a parameter set flag. The video encoder may, e.g., be configured to generate the video data stream such that the video data stream may, e.g., comprise the parameter set flag that indicates whether or not the one or more scalable nesting supplemental enhancement information messages comprising timing information for each of the one or more output layer sets are present within the video data stream.

In an embodiment, the video encoder may, e.g., be configured to generate the video data stream such that a sequence parameter set of the video data stream may, e.g., comprise the parameter set flag.

According to an embodiment, the video encoder may, e.g., be configured to generate the video data stream such that the parameter set flag is an sps_ols_nest_timing_present_flag.

In an embodiment, the video encoder may, e.g., be configured to generate the video data stream such that the video data stream may, e.g., comprise a further supplemental enhancement information message which may, e.g., comprise a parameter set flag. The video encoder may, e.g., be configured to generate the video data stream such that the parameter set flag indicates whether or not the one or more scalable nesting supplemental enhancement information messages for each of the one or more output layer sets are present within the video data stream.

According to an embodiment, the timing information may, e.g., comprise at least one of picture timing information and buffering period information and decoding unit information.

In an embodiment, the timing information is timing information for a Hypothetical Reference Decoder.

Furthermore, according to an embodiment, an apparatus for receiving a video data stream as an input bitstream, wherein the video data stream has a video encoded thereinto, is provided. The apparatus is to process the input bitstream to obtain a sub-bitstream. An indication indicates whether or not one or more scalable nesting supplemental enhancement information messages comprising timing information for each of one or more output layer sets are present within the video data stream.

According to an embodiment, the indication is a parameter set flag. The apparatus may, e.g., be configured to process the video data stream comprising the parameter set flag that indicates whether or not the one or more scalable nesting supplemental enhancement information messages comprising timing information for each of the one or more output layer sets are present within the video data stream.

In an embodiment, a sequence parameter set of the video data stream may, e.g., comprise the parameter set flag.

According to an embodiment, the parameter set flag is an sps_ols_nest_timing_present_flag.

In an embodiment, the video data stream may, e.g., comprise a further supplemental enhancement information message which may, e.g., comprise a parameter set flag. The parameter set flag indicates whether or not the one or more scalable nesting supplemental enhancement information messages for each of the one or more output layer sets are present within the video data stream. The apparatus may, e.g., be configured to process the further supplemental enhancement information message.

According to an embodiment, the timing information may, e.g., comprise at least one of picture timing information and buffering period information and decoding unit information.

According to an embodiment, if the one or more scalable nesting supplemental enhancement information messages comprise timing information which may, e.g., comprise picture timing information for each of the one or more output layer sets are present within the video data stream, the apparatus may, e.g., be configured to substitute picture timing information of a non-scalable-nested picture timing supplemental enhancement information message. If the one or more scalable nesting supplemental enhancement information messages comprise timing information which comprises buffering period information for each of the one or more output layer sets are present within the video data stream, the apparatus may, e.g., be configured to substitute buffering period information of a non-scalable-nested buffering period supplemental enhancement information message. If the one or more scalable nesting supplemental enhancement information messages comprise timing information which comprises decoding unit information for each of the one or more output layer sets are present within the video data stream, the apparatus may, e.g., be configured to substitute decoding unit information of a non-scalable-nested decoding unit supplemental enhancement information message.

In an embodiment, the timing information is timing information for a Hypothetical Reference Decoder.

According to an embodiment, the apparatus may, e.g., be configured to decode the sub-bitstream to decode the video.

Moreover, according to an embodiment, a system for encoding a video into a video data stream, and for decoding the video is provided. The system comprises a video encoder as described above and an apparatus as described above. The video encoder may, e.g., be configured to encode the video into the video data stream, such that the video data stream has the video encoded thereinto. The apparatus may, e.g., be configured to receive the video data stream as an input bitstream. Moreover, the apparatus may, e.g., be configured to process the input bitstream to obtain a sub-bitstream.

Furthermore, the apparatus may, e.g., be configured to decode the sub-bitstream to decode the video.

VVC draft specification contains definition of OLS in the VPS that can also be used in HRD based conformance testing of OLS sub-bitstreams based on the respective HRD SEI messages (BP, PT, DUI) that are in the bitstream in a nested form (scalable nesting SEI message). When OLS are defined, it is crucial to guarantee that the respective HRD SEI messages for these OLS are in the bitstream to enable conformance testing.

Therefore, it is part of the invention, that an indication is in the bitstream (either a parameter set flag such as, for instance, sps_ols_scal_nest_timing_present_flag in the SPS or a new SEI message containing such a flag) indicates that scalable nesting SEI messages for all OLS shall be present within the bitstream.

In the following, the concept how HRD SEIs apply for sub-bitstreams is described.

According to an embodiment, a video data stream having a video encoded thereinto, is provided. An indication within the video data stream indicates whether or not timing information for a sub-bitstream is to be obtained from one or more non-scalable-nested picture timing supplemental enhancement information messages of the video data stream.

In an embodiment, if the indication indicates that the timing information for the sub-bitstream is not to be obtained from the one or more non-scalable-nested picture timing supplemental enhancement information messages, this indicates that the one or more non-scalable-nested picture timing supplemental enhancement information messages are to be substituted by one or more scalable nesting picture timing supplemental enhancement information messages.

In an embodiment, the indication is a flag. One of the one or more the scalable nesting supplemental enhancement information messages may, e.g., comprise the flag that indicates whether or not the timing information for the sub-bitstream may, e.g., be configured to be obtained from the one or more non-scalable-nested picture timing supplemental enhancement information messages.

According to an embodiment, the flag is a use_orig_pic_timing_flag.

In an embodiment, the video data stream may, e.g., comprise a video parameter set. The indication is a flag. The video parameter set may, e.g., comprise the flag that indicates whether or not the timing information for the sub-bitstream may, e.g., be configured to be obtained from the one or more non-scalable-nested picture timing supplemental enhancement information messages.

According to an embodiment, the flag is a same_pic_timing_within_ols_flag.

In an embodiment, the flag is a general_same_pic_timing_in_all_ols_flag.

According to an embodiment, the indication indicates that each of the one or more non-scalable-nested picture timing supplemental enhancement information messages in each access unit of one or more access units applies to an access unit for any output layer set in the video data stream and that no scalable-nested picture timing supplemental enhancement information messages are present, or indicates that the non-scalable-nested picture timing supplemental enhancement information message in each access unit of the one or more access units might or might not apply to the access unit for any output layer set in the video data stream and that scalable-nested picture timing supplemental enhancement information messages might be present.

In an embodiment, if the indication indicates that the timing information for the sub-bitstream may, e.g., be configured to be obtained from the one or more non-scalable-nested picture timing supplemental enhancement information messages, at least one of one or more scalable nesting supplemental enhancement information messages occurs before the one or more non-scalable-nested picture timing supplemental enhancement information messages within an access unit of the bitstream.

According to an embodiment, the indication is a constraint flag. The one or more non-scalable-nested picture timing supplemental enhancement information messages comprise the constraint flag that indicates whether or not the one or more non-scalable-nested picture timing supplemental enhancement information messages apply to the at least one of the one or more sub-bitstreams.

In an embodiment, the indication is a first indication. A second indication within the video data stream indicates whether or not the timing information for the sub-bitstream is further to be obtained from one or more non-scalable-nested buffering period supplemental enhancement information messages of the video data stream; and/or a third indication within the video data stream indicates whether or not the timing information for the sub-bitstream is further to be obtained from one or more non-scalable-nested decoding unit supplemental enhancement information messages of the video data stream.

According to an embodiment, the indication within the video data stream furthermore indicates whether or not the timing information for the sub-bitstream is further to be obtained from one or more non-scalable-nested buffering period supplemental enhancement information messages of the video data stream; and/or the indication within the video data stream furthermore indicates whether or not the timing information for the sub-bitstream is further to be obtained from one or more non-scalable-nested decoding unit supplemental enhancement information messages of the video data stream.

Furthermore, according to an embodiment, a video data stream having a video encoded thereinto, is provided. A first indication within the video data stream indicates whether or not timing information for a sub-bitstream is to be obtained from the one or more non-scalable-nested buffering period supplemental enhancement information messages of the video data stream. And/or, a second indication within the video data stream indicates whether or not the timing information for the sub-bitstream is to be obtained from the one or more non-scalable-nested decoding unit supplemental enhancement information messages of the video data stream.

Moreover, according to an embodiment, a video data stream comprises one or more non-scalable-nested supplemental enhancement information messages comprising timing information, is provided. If the video data stream comprises a scalable nesting supplemental enhancement information message comprising the timing information, this indicates that depending on the scalable nesting supplemental enhancement information message: All of the one or more non-scalable-nested timing information supplemental enhancement information messages are to be substituted by the scalable nesting supplemental enhancement information message comprising the timing information (e.g., the timing information is picture timing information or buffering period information or decoding unit information). Or a subset comprising at least one of the one or more non-scalable-nested timing information enhancement information messages is to be substituted by the scalable nesting supplemental enhancement information message comprising the timing information (e.g., the timing information is the picture timing information or the buffering period information or the decoding unit information).

According to an embodiment, the one or more non-scalable-nested supplemental enhancement information messages comprising the timing information are one or more non-scalable-nested picture timing supplemental enhancement information messages, and the scalable nesting supplemental enhancement information message comprising the timing information is a scalable nesting picture timing supplemental enhancement information message. Or, the one or more non-scalable-nested supplemental enhancement information messages comprising the timing information are one or more non-scalable-nested buffering period supplemental enhancement information messages, and the scalable nesting supplemental enhancement information message comprising the timing information is a scalable nesting buffering period supplemental enhancement information message. Or the one or more non-scalable-nested supplemental enhancement information messages comprising the timing information are one or more non-scalable-nested decoding unit supplemental enhancement information messages, and the scalable nesting supplemental enhancement information message comprising the timing information is a scalable nesting decoding unit supplemental enhancement information message.

In an embodiment, if the video data stream may, e.g., comprise the scalable nesting supplemental enhancement information message comprising the timing information, the scalable nesting supplemental enhancement information message comprising the timing information occurs before the one or more non-scalable-nested supplemental enhancement information messages comprising the timing information within an access unit of the bitstream.

According to an embodiment, the timing information is timing information for a Hypothetical Reference Decoder.

In an embodiment, the sub-bitstream depends on an output layer set and/or depends on a sub-layer, and/or depends on a subpicture, and/or depends on a subset of a decoding unit.

Moreover, according to an embodiment, a video encoder for encoding a video into a video data stream, such that the video data stream has the video encoded thereinto, is provided. The video encoder is to generate the video data stream such that an indication within the video data stream indicates whether or not timing information for a sub-bitstream is to be obtained from one or more non-scalable-nested picture timing supplemental enhancement information messages of the video data stream.

According to an embodiment, if the indication indicates that the timing information for the sub-bitstream is not to be obtained from the one or more non-scalable-nested picture timing supplemental enhancement information messages, this indicates that the one or more non-scalable-nested picture timing supplemental enhancement information messages are to be substituted by one or more scalable nesting picture timing supplemental enhancement information messages.

In an embodiment, the indication is a flag. The video encoder may, e.g., be configured to generate the video data stream such that one of the one or more scalable nesting supplemental enhancement information messages may, e.g., comprise the flag that indicates whether or not the timing information for the sub-bitstream may, e.g., be configured to be obtained from the one or more non-scalable-nested picture timing supplemental enhancement information messages.

According to an embodiment, the flag is a use_orig_pic_timing_flag.

In an embodiment, the video data stream may, e.g., comprise a video parameter set. The indication may, e.g., be a flag. The video encoder may, e.g., be configured to generate the video data stream such that the video parameter set may, e.g., comprise the flag that indicates whether or not the timing information for the sub-bitstream may, e.g., be configured to be obtained from the one or more non-scalable-nested picture timing supplemental enhancement information messages.

According to an embodiment, the flag is a same_pic_timing_within_ols_flag.

In an embodiment, the flag is a general_same_pic_timing_in_all_ols_flag.

According to an embodiment, the indication indicates that each of the one or more non-scalable-nested picture timing supplemental enhancement information messages in each access unit of one or more access units applies to an access unit for any output layer set in the video data stream and that no scalable-nested picture timing supplemental enhancement information messages are present, or indicates that the non-scalable-nested picture timing supplemental enhancement information message in each access unit of the one or more access units might or might not apply to the access unit for any output layer set in the video data stream and that scalable-nested picture timing supplemental enhancement information messages might be present.

In an embodiment, if the indication indicates that the timing information for the sub-bitstream may, e.g., be configured to be obtained from the one or more non-scalable-nested picture timing supplemental enhancement information messages, at least one of one or more scalable nesting supplemental enhancement information messages occurs before the one or more non-scalable-nested picture timing supplemental enhancement information messages within an access unit of the bitstream.

According to an embodiment, the indication is a constraint flag. The video encoder may, e.g., be configured to generate the video data stream such that the one or more non-scalable-nested picture timing supplemental enhancement information messages comprise the constraint flag that indicates whether or not the one or more non-scalable-nested picture timing supplemental enhancement information messages apply to the at least one of the one or more sub-bitstreams.

In an embodiment, the indication is a first indication. A second indication within the video data stream indicates whether or not the timing information for the sub-bitstream is further to be obtained from one or more non-scalable-nested buffering period supplemental enhancement information messages of the video data stream; and/or a third indication within the video data stream indicates whether or not the timing information for the sub-bitstream is further to be obtained from the one or more non-scalable-nested decoding unit supplemental enhancement information messages of the video data stream.

According to an embodiment, the indication within the video data stream furthermore indicates whether or not the timing information for the sub-bitstream is further to be obtained from the one or more non-scalable-nested buffering period supplemental enhancement information messages of the video data stream; and/or the indication within the video data stream furthermore indicates whether or not the timing information for the sub-bitstream is further to be obtained from the one or more non-scalable-nested decoding unit supplemental enhancement information messages of the video data stream.

Moreover, according to an embodiment, a video encoder for encoding a video into a video data stream, such that the video data stream has the video encoded thereinto, is provided. A first indication within the video data stream indicates whether or not timing information for a sub-bitstream is to be obtained from the one or more non-scalable-nested buffering period supplemental enhancement information messages of the video data stream. And/or, a second indication within the video data stream indicates whether or not the timing information for the sub-bitstream is to be obtained from the one or more non-scalable-nested decoding unit supplemental enhancement information messages of the video data stream.

Furthermore, according to an embodiment, a video encoder for encoding a video into a video data stream, such that the video data stream has the video encoded thereinto, is provided. The video encoder is to generate the video data stream such that the video data stream comprises one or more non-scalable-nested supplemental enhancement information messages comprising timing information. If the video data stream comprises a scalable nesting supplemental enhancement information message comprising the timing information, this indicates that depending on the scalable nesting supplemental enhancement information message: All of the one or more non-scalable-nested timing information supplemental enhancement information messages are to be substituted by the scalable nesting supplemental enhancement information message comprising the timing information (e.g., the timing information is picture timing information or buffering period information or decoding unit information). Or: a subset comprising at least one of the one or more non-scalable-nested timing information supplemental enhancement information messages is to be substituted by the scalable nesting supplemental enhancement information message comprising the timing information (e.g., the timing information is the picture timing information or the buffering period information or the decoding unit information).

According to an embodiment, the video encoder may, e.g., be configured to generate the video data stream such that the one or more non-scalable-nested supplemental enhancement information messages comprising the timing information are one or more non-scalable-nested picture timing supplemental enhancement information messages, and the scalable nesting supplemental enhancement information message comprising the timing information is a scalable nesting picture timing supplemental enhancement information message. Or, the video encoder may, e.g., be configured to generate the video data stream such that the one or more non-scalable-nested supplemental enhancement information messages comprising the timing information are one or more non-scalable-nested buffering period supplemental enhancement information messages, and the scalable nesting supplemental enhancement information message comprising the timing information is a scalable nesting buffering period supplemental enhancement information message. Or, the video encoder may, e.g., be configured to generate the video data stream such that the one or more non-scalable-nested supplemental enhancement information messages comprising the timing information are one or more non-scalable-nested decoding unit supplemental enhancement information messages, and the scalable nesting supplemental enhancement information message comprising the timing information is a scalable nesting decoding unit supplemental enhancement information message.

In an embodiment, if the video data stream may, e.g., comprise the scalable nesting supplemental enhancement information message comprising the timing information, the video encoder may, e.g., be configured to generate the video data stream such that the scalable nesting supplemental enhancement information message comprising the timing information occurs before the one or more non-scalable-nested supplemental enhancement information messages comprising the timing information within an access unit of the bitstream.

According to an embodiment, the timing information is timing information for a Hypothetical Reference Decoder.

In an embodiment, the sub-bitstream depends on an output layer set and/or depends on a sub-layer, and/or depends on a subpicture, and/or depends on a subset of a decoding unit.

Moreover, according to an embodiment, an apparatus for receiving a video data stream as an input bitstream, wherein the video data stream has a video encoded thereinto, is provided. The apparatus is to process the input bitstream to obtain a sub-bitstream. An indication within the video data stream indicates whether or not timing information for a sub-bitstream is to be obtained from one or more non-scalable-nested picture timing supplemental enhancement information messages of the video data stream.

According to an embodiment, if the indication indicates that the timing information for the sub-bitstream is not to be obtained from the one or more non-scalable-nested picture timing supplemental enhancement information messages, the apparatus may, e.g., be configured to substitute the one or more non-scalable-nested picture timing supplemental enhancement information messages by one or more scalable nesting picture timing supplemental enhancement information messages.

According to an embodiment, the indication may, e.g., be a flag. One of the one or more the scalable nesting supplemental enhancement information messages may, e.g., comprise the flag which indicates whether or not the timing information for the sub-bitstream may, e.g., be configured to be obtained from the one or more non-scalable-nested picture timing supplemental enhancement information messages.

In an embodiment, the flag is a use_orig_pic_timing_flag.

According to an embodiment, the video data stream may, e.g., comprise a video parameter set. The indication may, e.g., be a flag. The video parameter set may, e.g., comprise the flag that indicates whether or not the timing information for the sub-bitstream may, e.g., be configured to be obtained from the one or more non-scalable-nested picture timing supplemental enhancement information messages.

In an embodiment, the flag is a same_pic_timing_within_ols_flag.

According to an embodiment, the flag is a general_same_pic_timing_in_all_ols_flag.

In an embodiment, the indication indicates that each of the one or more non-scalable-nested picture timing supplemental enhancement information messages in each access unit of one or more access units applies to an access unit for any output layer set in the video data stream and that no scalable-nested picture timing supplemental enhancement information messages are present, or indicates that the non-scalable-nested picture timing supplemental enhancement information message in each access unit of the one or more access units might or might not apply to the access unit for any output layer set in the video data stream and that scalable-nested picture timing supplemental enhancement information messages might be present.

According to an embodiment, if the indication indicates that the non-scalable-nested picture timing supplemental enhancement information message in each access unit of the one or more access units might or might not apply to the access unit for any output layer set in the video data stream and that scalable-nested picture timing supplemental enhancement information messages might be present, the apparatus is configured to remove from the input bitstream or from the sub-bitstream all supplemental enhancement information network abstraction layer units that comprise a non-scalable-nested supplemental enhancement information messages with picture timing content.

In an embodiment, if the indication indicates that the timing information for the sub-bitstream may, e.g., be configured to be obtained from the one or more non-scalable-nested picture timing supplemental enhancement information messages, the apparatus may, e.g., be configured to process at least one of one or more scalable nesting supplemental enhancement information messages, which occurs before the one or more non-scalable-nested picture timing supplemental enhancement information messages within an access unit of the bitstream, before the apparatus may, e.g., be configured to process the one or more non-scalable-nested picture timing supplemental enhancement information messages within the access unit.

According to an embodiment, the indication is a constraint flag. The apparatus may, e.g., be configured to process the one or more non-scalable-nested picture timing supplemental enhancement information messages which comprise the constraint flag that indicates whether or not the one or more non-scalable-nested picture timing supplemental enhancement information messages apply to the at least one of the one or more sub-bitstreams.

In an embodiment, the indication is a first indication. A second indication within the video data stream indicates whether or not the timing information for the sub-bitstream is further to be obtained from one or more non-scalable-nested buffering period supplemental enhancement information messages of the video data stream; and/or a third indication within the video data stream indicates whether or not the timing information for the sub-bitstream is further to be obtained from one or more non-scalable-nested decoding unit supplemental enhancement information messages of the video data stream.

According to an embodiment, the indication within the video data stream furthermore indicates whether or not the timing information for the sub-bitstream is further to be obtained from one or more non-scalable-nested buffering period supplemental enhancement information messages of the video data stream; and/or the indication within the video data stream furthermore indicates whether or not the timing information for the sub-bitstream is further to be obtained from one or more non-scalable-nested decoding unit supplemental enhancement information messages of the video data stream.

Furthermore, according to an embodiment, an apparatus for receiving a video data stream as an input bitstream, wherein the video data stream has a video encoded thereinto, is provided. The apparatus is to process the input bitstream to obtain a sub-bitstream. A first indication within the video data stream indicates whether or not timing information for a sub-bitstream is to be obtained from one or more non-scalable-nested buffering period supplemental enhancement information messages of the video data stream. And/or, a second indication within the video data stream indicates whether or not the timing information for the sub-bitstream is to be obtained from one or more non-scalable-nested decoding unit supplemental enhancement information messages of the video data stream.

Moreover, according to an embodiment, an apparatus for receiving a video data stream as an input bitstream, wherein the video data stream has a video encoded thereinto, is provided. The apparatus is to process the input bitstream to obtain a sub-bitstream. The video data stream comprises one or more non-scalable-nested supplemental enhancement information messages comprising timing information. If the video data stream comprises a scalable nesting supplemental enhancement information message comprising the timing information, the apparatus is to substitute, depending on the scalable nesting supplemental enhancement information message: All of the one or more non-scalable-nested timing information supplemental enhancement information messages by the scalable nesting supplemental enhancement information message comprising the timing information (e.g., the timing information is picture timing information or buffering period information or decoding unit information). Or, a subset comprising at least one of the one or more non-scalable-nested timing information supplemental enhancement information messages by the scalable nesting supplemental enhancement information message comprising the timing information (e.g., the timing information is the picture timing information or the buffering period information or the decoding unit information).

According to an embodiment, the one or more non-scalable-nested supplemental enhancement information messages comprising the timing information are one or more non-scalable-nested picture timing supplemental enhancement information messages, and the scalable nesting supplemental enhancement information message comprising the timing information is a scalable nesting picture timing supplemental enhancement information message. Or, the one or more non-scalable-nested supplemental enhancement information messages comprising the timing information are one or more non-scalable-nested buffering period supplemental enhancement information messages, and the scalable nesting supplemental enhancement information message comprising the timing information is a scalable nesting buffering period supplemental enhancement information message. Or, the one or more non-scalable-nested supplemental enhancement information messages comprising the timing information are one or more non-scalable-nested decoding unit supplemental enhancement information messages, and the scalable nesting supplemental enhancement information message comprising the timing information is a scalable nesting decoding unit supplemental enhancement information message.

In an embodiment, if the video data stream may, e.g., comprise the scalable nesting supplemental enhancement information message comprising the timing information. The scalable nesting supplemental enhancement information message comprising the timing information occurs before the one or more non-scalable-nested supplemental enhancement information messages comprising the timing information within an access unit of the bitstream. The apparatus may, e.g., be configured to process the scalable nesting supplemental enhancement information message comprising the timing information before the one or more non-scalable-nested supplemental enhancement information messages comprising the timing information.

According to an embodiment, the timing information is timing information for a Hypothetical Reference Decoder.

In an embodiment, the sub-bitstream depends on an output layer set and/or depends on a sub-layer, and/or depends on a subpicture, and/or depends on a subset of a decoding unit.

According to an embodiment, the apparatus may, e.g., be configured to decode the sub-bitstream to decode the video.

Moreover, according to an embodiment, a system for encoding a video into a video data stream, and for decoding the video is provided. The system comprises a video encoder as described above and an apparatus as described above. The video encoder may, e.g., be configured to encode the video into the video data stream, such that the video data stream has the video encoded thereinto. The apparatus may, e.g., be configured to receive the video data stream as an input bitstream. Moreover, the apparatus may, e.g., be configured to process the input bitstream to obtain a sub-bitstream. Furthermore, the apparatus may, e.g., be configured to decode the sub-bitstream to decode the video.

VVC draft specification contains SEI messages controlling the HRD timing behaviour, i.e. the Buffering Period SEI message and the Picture Timing SEI message, when the bitstream is decoded.

Currently the VVC draft specification already contains all Picture Timing SEI messages that apply to several target Temporal IDs, i.e. temporal scalability does not necessarily require scalable nesting of additional timing information. Therefore, when extracting sub-bitstreams (e.g. in a layered scenario through OLS or spatially by extraction of sub-pictures), it might in some cases not be required to modify/exchange Picture Timing SEI messages in such a way.

In the following, Output Layer Set extraction is described.

In one embodiment, signalling is added that indicates that Picture Timing SEI messages in the bitstream apply to any sub-bitstream (as defined/corresponding to some Output Layer Set (OLS) A) of the bitstream (as defined/corresponding by some OLS B), and only Buffering period SEI messages are to be replaced with their scalable-nested counterparts. Example syntax:

|  | Descriptor |
|---|---|
| scalable nesting( payloadSize ) { |  |
|   nesting_ols_flag | u(1) |
|   if( nesting_ols_flag ) { |  |
|     use_orig_pic_timing_flag | u(1) |
|     nesting_num_olss_minus1 | ue(v) |
|     for( i = 0; i <= nesting_num_olss_minus1; i++ ) |  |
|       nesting_ols_idx_delta_minus1[ i ] | ue(v) |
|   } else { |  |
|     nesting_all_layers_flag | u(1) |
|     if( !nesting_all_layers_flag ) { |  |
|       nesting_num_layers_minus1 | ue(v) |
|       for( i = 1; i <= nesting_num_layers_minus1; i++ ) |  |
|         nesting_layer_id[ i ] | u(6) |
|     } |  |
|   } |  |
|   nesting_num_seis_minus1 | ue(v) |
|   while( !byte_aligned( ) ) |  |
|     nesting_zero_bit /* equal to 0 */ | u(1) |
|   for( i = 0; i <= nesting_num_seis_minus1; i++ ) |  |
|     sei_message( ) |  |
| } |  |

As of now, the scalable nesting SEI messages follows the HRD SEI messages within an access unit. Therefore, as part of the above embodiment, when use_orig_pic_timing_flag is equal to 1, the scalable nesting SEI message containing the OLS specific HRD SEI messages must occur before respective PT SEI message (the one to keep during extraction) within an access unit in bitstream order.

Or, in an alternative embodiment, the indication is in the VPS as a constraint flag:

|  | Descriptor |
|---|---|
| general_constraint_info( ) { |  |
|   general_progressive_source_flag | u(1) |
|   ... |  |
|   same_pic_timing_within_ols_flag | u(1) |
|   ... |  |
|   while( !byte_aligned( ) ) |  |
|     gci_alignment_zero_bit | f(1) |
| } |  |

Or, in an alternative embodiment, the indication is in the Picture Timing SEI message as a constraint flag.

This the extraction process has been changed.

In the following, a sub-bitstream extraction process is described.

Inputs to this process are a bitstream inBitstream, a target OLS index targetOlsIdx, and a target highest TemporalId value tIdTarget.

Output of this process is a sub-bitstream outBitstream.

It is a requirement of bitstream conformance for the input bitstream that any output sub-bitstream that is the output of the process specified in this clause with the bitstream, targetOlsIdx equal to an index to the list of OLSs specified by the VPS, and tIdTarget equal to any value in the range of 0 to 6, inclusive, as inputs, and that satisfies the following conditions shall be a conforming bitstream:

The output sub-bitstream contains at least one VCL NAL unit with nuh_layer_id equal to each of the nuh_layer_id values in LayerIdInOls[targetOlsIdx].

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream OutBitstream is derived as follows:

The bitstream outBitstream is set to be identical to the bitstream inBitstream.

Remove from outBitstream all NAL units with TemporalId greater than tIdTarget.

Remove from outBitstream all NAL units with nal_unit_type not equal to any of VPS_NUT, DPS_NUT, and EOB_NUT and with nuh_layer_id not included in the list LayerIdInOls[targetOlsIdx].

Remove from outBitstream all SEI NAL units that contain a scalable nesting SEI message that has nesting_ols_flag equal to 1 and there is no value of i in the range of 0 to nesting_num_olss_minus1, inclusive, such that NestingOlsIdx[i] is equal to targetOlsIdx.

When targetOlsIdx is greater than 0, remove from outBitstream all SEI NAL units that contain a non-scalable-nested SEI message with payloadType equal to 0 (buffering period), or 130 (decoding unit information).

When targetOlsIdx is greater than 0 and use_orig_pic_timing_flag/same_pic_timing_within_ols_flag are equal to 0, remove from outBitstream all SEI NAL units that contain a non-scalable-nested SEI message with payloadType equal to 1 (picture timing).

When outBitstream contains SEI NAL units that contain a scalable nesting SEI message and that are applicable to outBitstream (NestingOlsIdx[i] is equal to targetOlsIdx), do the following:

When use_orig_pic_timing_flag/same_pic_timing_within_ols_flag are equal to 0, extract appropriate non-scalable-nested SEI message with payloadType equal to 0 (buffering period), 1 (picture timing), or 130 (decoding unit information) from the scalable nesting SEI message and put those messages into outBitstream.

Otherwise, (when use_orig_pic_timing_flag/same_pic_timing_within_ols_flag are equal to 1), extract appropriate non-scalable-nested SEI message with payloadType equal to 0 (buffering period), or 130 (decoding unit information) from the scalable nesting SEI message when present which are applicable to outBitstream (NestingOlsIdx[i] is equal to targetOlsIdx) and put those messages into outBitstream.

Remove from outBitstream all SEI NAL units that contain a scalable nesting SEI message An indicating, e.g., a flag may, e.g., be employed, for example, a general_same_pic_timing_in_all_ols_flag or, for example, a same_pic_timing_within_ols_flag.

general_same_pic_timing_in_all_ols_flag (or same_pic_timing_within_ols_flag) equal to a first value, e.g., equal to 1, specifies that the non-scalable-nested PT SEI message in each AU applies to the AU for any OLS in the bitstream and no scalable-nested PT SEI messages are present. general_same_pic_timing_in_all_ols_flag equal to a second value, e.g., 0, specifies that the non-scalable-nested PT SEI message in each AU might or might not apply to the AU for any OLS in the bitstream and scalable-nested PT SEI messages might be present.

For example, when general_same_pic_timing_in_all_ols_flag is equal to the second value, e.g., 0, (an apparatus may) remove from an input bitstream or from a output bitstream (e.g., outBitstream/sub-bitstream) all SEI NAL units that comprise a non-scalable-nested SEI message with payloadType equal to 1 (PT).

In embodiments, also the Buffering Period SEI message may in some instances not need replacement through a scalable-nested variant so that an additional indication could be carried in a Parameter Set or the Buffering Period SEI message itself, that the indicated timings also apply to extracted sub-bitstream and the extraction process would further be modified to keep the original BP and PT SEI messages depending on the respective indication.

In the following, subpicture extraction is described.

In another embodiment that considers the case of subpicture sub-bitstream extraction, respective signalling is added to the bitstream (e.g. in the syntax of the subpicture-nesting SEI message, Picture Timing SEI message, Parameter sets) that indicates that Picture Timing SEI messages in the bitstream apply to any sub-bitstream as defined by a subpicture or a sub-picture set of the bitstream as constituted by the combination of all subpictures contained in the bitstream, and only Buffering period SEI messages are to be replaced with their subpicture-nested counterparts.

Alternatively, also the Buffering Period SEI message may in some instances not need replacement through a subpicture-nested variant so that an additional indication could be carried in a Parameter Set or the Buffering Period SEI message itself, that the indicated timings also apply to extracted sub-bitstream and the extraction process would further be modified to keep the original BP and PT SEI messages depending on the respective indication.

In the following, removal of non-scalable nested HRD SEI messages based on presence of scalable nested HRD SEI messages is described.

In another embodiment of the invention, the scope of non-scalable nested HRD SEI messages (e.g. BP, PT, DUI SEI messages), i.e. whether some (e.g. only PT SEI messages) or all of them apply to extractable sub-bitstreams (e.g. OLS), is indicated through the presence of respective substitute SEI messages in the form of scalable nested HRD SEI messages wherein the absence of such messages is the indication that the respective non-scalable HRD SEI messages apply to the OLS. The consequence of this scope indication is that the removal of non-scalable nested SEI messages in the sub-bitstream extraction process depends on the presence of scalable nested SEI messages that can serve as a substitute for removed messages and that in absence of such scalable nested SEI message, the non-scalable nested SEI messages remain in the extracted sub-bitstream.

In a further embodiment, the respective scalable-nested HRD SEI messages are placed before the non-scalable nested HRD SEI messages in bitstream order in an access unit to ease sequential processing of the bitstream during extraction.

In the following, simplified scalable nesting is described.

According to an embodiment, a video data stream having a video encoded thereinto, is provided. The video data stream comprises a plurality of access units. For each access unit of the plurality of access units, if the access unit comprises two or more scalable nested supplemental enhancement information messages which comprise buffer period information and/or picture timing information for an output layer set, then the buffer period information and/or the picture timing information for the output layer set is equal in all of the two or more scalable nested supplemental enhancement information messages of the access unit.

Furthermore, according to an embodiment, a video data stream having a video encoded thereinto, is provided. The video data stream comprises a plurality of access units. For each access unit of the plurality of access units, if the access unit comprises two or more scalable nested supplemental enhancement information messages which comprise buffer period information and/or picture timing information for an output layer set, then the video data stream comprises an indication indicating whether or not the buffer period information and/or the picture timing information for the output layer set is equal in all of the two or more scalable nested supplemental enhancement information messages of the access unit.

Moreover, according to an embodiment, a video data stream having a video encoded thereinto, is provided. The video data stream comprises a plurality of access units. For each access unit of the plurality of access units, if the access unit comprises three or more scalable nested supplemental enhancement information messages which comprise buffer period information and/or picture timing information for an output layer set, then the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Furthermore, according to an embodiment, a video data stream having a video encoded thereinto, is provided. The video data stream comprises a plurality of access units. For each access unit of the plurality of access units, if the access unit comprises three or more scalable nested supplemental enhancement information messages which comprise buffer period information and/or picture timing information for an output layer set, then the video data stream comprises an indication indicating whether or not the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

In an embodiment, all scalable nested supplemental enhancement information messages in an access unit with a same value of an identifier, identifying an output layer set, may, e.g., carry the same buffer period information and/or the same picture timing information.

According to an embodiment, for a particular access unit of the plurality of access units, any picture timing supplemental enhancement information message that applies to a set of layers and sub-layers for said output layer set, may, e.g., carry the same picture timing information. And/or, for a particular access unit of the plurality of access units, any buffer period supplemental enhancement information message that applies to a set of layers and sub-layers for said output layer set, may, e.g., carry the same buffer period information. And/or, for a particular access unit of the plurality of access units, any decoding unit supplemental enhancement information message that applies to a set of layers and sub-layers for said output layer set, may, e.g., carry a same decoding unit information.

In an embodiment, for two scalable-nested supplemental enhancement information messages of a particular payload type in an access unit with the same value of an identifier, identifying an output layer set, may, e.g., carry a same content.

Moreover, according to an embodiment, a video encoder for encoding a video into a video data stream, such that the video data stream has the video encoded thereinto, is provided. The video encoder is to generate the video data stream such that the video data stream comprises a plurality of access units. For each access unit of the plurality of access units. If the access unit comprises two or more scalable nested supplemental enhancement information messages which comprise buffer period information and/or picture timing information for an output layer set, then the video encoder is to generate the video data stream such that the buffer period information and/or the picture timing information for the output layer set is equal in all of the two or more scalable nested supplemental enhancement information messages of the access unit.

Furthermore, according to an embodiment, a video encoder for encoding a video into a video data stream, such that the video data stream has the video encoded thereinto, is provided. The video encoder is to generate the video data stream such that the video data stream comprises a plurality of access units. For each access unit of the plurality of access units, if the access unit comprises two or more scalable nested supplemental enhancement information messages which comprise buffer period information and/or picture timing information for an output layer set, then the video encoder is to generate the video data stream such that the video data stream comprises an indication indicating whether or not the buffer period information and/or the picture timing information for the output layer set is equal in all of the two or more scalable nested supplemental enhancement information messages of the access unit.

Moreover, according to an embodiment, a video encoder for encoding a video into a video data stream, such that the video data stream has the video encoded thereinto, is provided. The video encoder is to generate the video data stream such that the video data stream comprises a plurality of access units. For each access unit of the plurality of access units, if the access unit comprises three or more scalable nested supplemental enhancement information messages which comprise buffer period information and/or picture timing information for an output layer set, then the video encoder is to generate the video data stream such that the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Furthermore, according to an embodiment, a video encoder for encoding a video into a video data stream, such that the video data stream has the video encoded thereinto, is provided. The video encoder is to generate the video data stream such that the video data stream comprises a plurality of access units. For each access unit of the plurality of access units, if the access unit comprises three or more scalable nested supplemental enhancement information messages which comprise buffer period information and/or picture timing information for an output layer set, then the video encoder is to generate the video data stream such that the video data stream comprises an indication indicating whether or not the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

In an embodiment, all scalable nested supplemental enhancement information messages in an access unit with a same value of an identifier, identifying an output layer set, may, e.g., carry the same buffer period information and/or the same picture timing information.

According to an embodiment, for a particular access unit of the plurality of access units, any picture timing supplemental enhancement information message that applies to a set of layers and sub-layers for said output layer set, may, e.g., carry the same picture timing information. And/or, for a particular access unit of the plurality of access units, any buffer period supplemental enhancement information message that applies to a set of layers and sub-layers for said output layer set, may, e.g., carry the same buffer period information. And/or, for a particular access unit of the plurality of access units, any decoding unit supplemental enhancement information message that applies to a set of layers and sub-layers for said output layer set, may, e.g., carry a same decoding unit information.

In an embodiment, for two scalable-nested supplemental enhancement information messages of a particular payload type in an access unit with the same value of an identifier, identifying an output layer set, carry a same content.

Furthermore, according to an embodiment, an apparatus for receiving a video data stream as an input bitstream, wherein the video data stream has a video encoded thereinto, is provided. The input bitstream comprises a plurality of access units. The apparatus is to process the access units of the input bitstream to obtain a sub-bitstream. For each access unit of the plurality of access units, if the access unit comprises two or more scalable nested supplemental enhancement information messages which comprise buffer period information and/or picture timing information for an output layer set, then the buffer period information and/or the picture timing information for the output layer set is equal in all of the two or more scalable nested supplemental enhancement information messages of the access unit.

Moreover, according to an embodiment, an apparatus for receiving a video data stream as an input bitstream, wherein the video data stream has a video encoded thereinto, is provided. The input bitstream comprises a plurality of access units. The apparatus is to process the access units of the input bitstream to obtain a sub-bitstream. For each access unit of the plurality of access units. If the access unit comprises two or more scalable nested supplemental enhancement information messages which comprise buffer period information and/or picture timing information for an output layer set, then the video data stream comprises an indication indicating whether or not the buffer period information and/or the picture timing information for the output layer set is equal in all of the two or more scalable nested supplemental enhancement information messages of the access unit.

Furthermore, according to an embodiment, an apparatus for receiving a video data stream as an input bitstream, wherein the video data stream has a video encoded thereinto, is provided. The input bitstream comprises a plurality of access units, the apparatus is to process the access units of the input bitstream to obtain a sub-bitstream. For each access unit of the plurality of access units, if the access unit comprises three or more scalable nested supplemental enhancement information messages which comprise buffer period information and/or picture timing information for an output layer set, then the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

Moreover, according to an embodiment, an apparatus for receiving a video data stream as an input bitstream, wherein the video data stream has a video encoded thereinto, is provided. The input bitstream comprises a plurality of access units. The apparatus is to process the access units of the input bitstream to obtain a sub-bitstream. For each access unit of the plurality of access units, if the access unit comprises three or more scalable nested supplemental enhancement information messages which comprise buffer period information and/or picture timing information for an output layer set, then the video data stream comprises an indication indicating whether or not the buffer period information and/or the picture timing information for the output layer set appears only in one of the three or more scalable nested supplemental enhancement information messages and in another one of the three or more scalable nested supplemental enhancement information messages that immediately succeeds said one of the three or more scalable nested supplemental enhancement information messages.

In an embodiment, all scalable nested supplemental enhancement information messages in an access unit with a same value of an identifier, identifying an output layer set, may, e.g., carry the same buffer period information and/or the same picture timing information.

According to an embodiment, for a particular access unit of the plurality of access units, any picture timing supplemental enhancement information message that applies to a set of layers and sub-layers for said output layer set, may, e.g., carry the same picture timing information. And/or, for a particular access unit of the plurality of access units, any buffer period supplemental enhancement information message that applies to a set of layers and sub-layers for said output layer set, may, e.g., carry the same buffer period information. And/or, for a particular access unit of the plurality of access units, any decoding unit supplemental enhancement information message that applies to a set of layers and sub-layers for said output layer set, may, e.g., carry a same decoding unit information.

In an embodiment, for two scalable-nested supplemental enhancement information messages of a particular payload type in an access unit with the same value of an identifier, identifying an output layer set, carry a same content.

According to an embodiment, if the apparatus has found a buffer period scalable nesting supplemental enhancement information message for an output layer set, the apparatus may, e.g., be configured to use a content of said buffer period scalable nesting supplemental enhancement information for said output layer set, without searching for further buffer period scalable nesting supplemental enhancement information messages for said output layer set. And/or, if the apparatus has found a picture timing scalable nesting supplemental enhancement information message for an output layer set, the apparatus may, e.g., be configured to use a content of said picture timing scalable nesting supplemental enhancement information for said output layer set, without searching for further picture timing scalable nesting supplemental enhancement information messages for said output layer set.

According to an embodiment, the apparatus may, e.g., be configured to decode the sub-bitstream to decode the video.

Moreover, according to an embodiment, a system for encoding a video into a video data stream and for decoding the video is provided. The system comprises: a video encoder as described above and an apparatus as described above. The video encoder may, e.g., be configured to encode the video into the video data stream, such that the video data stream has the video encoded thereinto. The apparatus may, e.g., be configured to receive the video data stream as an input bitstream. Moreover, the apparatus may, e.g., be configured to process the input bitstream to obtain a sub-bitstream. Furthermore, the apparatus may, e.g., be configured to decode the sub-bitstream to decode the video.

When scalable nesting SEI messages are used to enable replacement of BP and PT SEI messages for all OLS in the bitstream, the current state-of-the-art allows an encoder to spread the BP and PT across multiple scalable nesting SEI messages. An extractor processing such a bitstream would potentially need to scan all scalable nesting SEI messages in an access unit (which can be many considering the amount of OLS and repetitions) until an applicable scalable nested BP and PT SEI messages are found.

In case an encoder puts a first scalable-nested BP or PT SEI message into an access unit of the bitstream and, in the course of encoding the pictures of said access unit, realizes an update of said BP or PT SEI message parameters is required through writing another BP or PT SEI message into said access unit of the bitstream, an extractor is subsequently burdened by having to ensure it uses the latest or most-up-to-date BP or PT SEI messages that was put into the access unit within the bitstream when extracting said access unit.

The invention is to simplify operation of an extractor by imposing constraints that remove the non-sensible options mentioned above.

In an embodiment, it may, e.g., be a requirement of bitstream conformance that all scalable SEI messages in an access unit with the same value of nesting_ols_idx_delta_minus1 (i.e. an identifier/index identifying an OLS) carry the same content (e.g., the same buffering period information and/or the same picture/timing information). Thereby, BP and PT SEI messages for an OLS can be found in one scalable nesting SEI message and an extractor can be sure, it has all the required information once it found a scalable nesting SEI message with the targeted OLS.

In an embodiment, it may, e.g., be a requirement of bitstream conformance that all scalable-nested SEI messages in an access unit with the same value of an identifier, e.g., an index, identifying an OLS, carry the same content (e.g., the same buffering period information and/or the same picture/timing information). For example, for a particular access unit, any PT SEI message that applies to a set of layers and sub-layers (for example for a particular OLS) the payload needs to be the same (for instance, for two PT SEI messages included in two separate scalable nesting SEI messages). Same applies to a BP SEI message and DUI SEI message. Thereby, BP and PT SEI messages for an OLS can be found in one scalable nesting SEI message and an extractor can be sure, it has all the required information once it found a scalable nesting SEI message with the targeted OLS.

According to an embodiment, it may, e.g., be a requirement of bitstream conformance that scalable-nested SEI messages of a particular payload type in an access unit with the same value of an identifier, e.g., an index, identifying an OLS, carry the same content (e.g., the same buffering period information and/or the same picture/timing information). For example, for a particular access unit in bitstream that carries, for instance, two scalable-nested PT SEI messages that apply to the same OLS, the payload of these two scalable-nested PT SEI messages shall be the equal and an extractor can be sure, it has all the required information once it found a scalable nesting SEI message with the targeted OLS.

In an embodiment, it may, e.g., be a requirement of bitstream conformance that all scalable-nested SEI messages in an access unit with the same value of an identifier, e.g., an index, identifying an OLS, carry the same content (e.g., the same buffering period information and/or the same picture/timing information). For example, BP and PT SEI messages for an OLS can be found in one scalable nesting SEI message and an extractor can be sure, it has all the required information once it found a scalable nesting SEI message with the targeted OLS.

According to an embodiment, it may, e.g., be a requirement of bitstream conformance that BP and PT SEI messages applicable to an OLS come within two scalable nesting SEI messages back to back, without any other scalable nesting SEI message NAL unit, not applicable to the OLS, in between in bitstream order.

In the following, temporal scalability for low delay and DU timing is described.

According to an embodiment, a video data stream having a video encoded thereinto, is provided. The video data stream comprises a plurality of access units. The video data stream comprises a spread factor which depends on a number of sub-bitstreams of the video data stream; or the video data stream comprises a clock sub-tick value which depends on a highest sub-bitstream among the sub-bitstreams of the video data stream.

According to an embodiment, each of the sub-bitstreams depends on an output layer set and/or depends on a sublayer, and/or depends on a sub-picture.

In an embodiment, a decoding unit removal time depends on an access unit removal time and on the spread factor.

According to an embodiment, the video data stream may, e.g., comprise a temporal distance, wherein the temporal distance may, e.g., be configured to be multiplied by a derived clock sub-tick value, wherein the derived clock sub-tick value is derivable using the spread factor.

In an embodiment, each of the plurality of spread factors is assigned to a sublayer of a plurality of sublayers. The video data stream may, e.g., comprise the plurality of spread factors.

According to an embodiment, the clock sub-tick value depends on a clock tick and further depends on the spread factor.

In an embodiment, the clock sub-tick value is defined according to:

$$ClockSubTick == ClockTick \div (\text{tick\_divisor\_minus2} + 2) *$$
$$(\text{tick\_divisor\_factor\_minus1}[HTid]+1)$$

wherein ClockSubTick is the clock sub-tick value, wherein ClockTick is the clock tick, wherein tick_divisor_minus2 is an additional tick divisor, and wherein tick_divisor_factor_minus1[HTid] indicates the spread factor of the video data stream.

Moreover, according to an embodiment, a video encoder for encoding a video into a video data stream, such that the video data stream has the video encoded thereinto, is provided. The video encoder is to generate the video data stream such that the video data stream comprises a plurality of access units. Furthermore, the video encoder is to generate the video data stream such that the video data stream comprises a spread factor which depends on a number of sub-bitstreams of the video data stream; or the video encoder is to generate the video data stream such that the video data stream comprises a clock sub-tick value which depends on a highest sub-bitstream among the sub-bitstreams of the video data stream.

According to an embodiment, each of the sub-bitstreams depends on an output layer set and/or depends on a sublayer, and/or depends on a sub-picture.

In an embodiment, the video encoder may, e.g., be configured to generate the video data stream such that a decoding unit removal time depends on an access unit removal time and on the spread factor.

According to an embodiment, the video encoder may, e.g., be configured to generate the video data stream such that the video data stream may, e.g., comprise a temporal distance, wherein the temporal distance may, e.g., be configured to be multiplied by a derived clock sub-tick value, wherein the derived clock sub-tick value is derivable using the spread factor.

In an embodiment, each of the plurality of spread factors is assigned to a sublayer of a plurality of sublayers. The video encoder may, e.g., be configured to generate the video data stream such that the video data stream may, e.g., comprise the plurality of spread factors.

According to an embodiment, the clock sub-tick value depends on a clock tick and further depends on the spread factor.

In an embodiment, the clock sub-tick value is defined according to:

$$ClockSubTick == ClockTick \div (\text{tick\_divisor\_minus2} + 2) * (\text{tick\_divisor\_factor\_minus1}[HTid]+1)$$

wherein ClockSubTick is the clock sub-tick value, wherein ClockTick is the clock tick, wherein tick_divisor_minus2 is an additional tick divisor, and wherein tick_divisor_factor_minus1[HTid] indicates the spread factor of the video data stream.

Furthermore, according to an embodiment, a video encoder for encoding a video into a video data stream, such that the video data stream has the video encoded thereinto, is provided. The video encoder is to generate the video data stream such that the video data stream comprises sub-layer specific frame rate information for a sub-layer; and/or the video encoder is to generate the video data stream such that the video data stream comprises sub-layer specific frame display duration information for the sub-layer.

Moreover, according to an embodiment, a video decoder for receiving a video data stream as an input bitstream, wherein the video data stream has a video encoded thereinto. The video data stream comprises a plurality of access units. The video decoder is to decode the video data stream to decode the video. The video data stream comprises a spread factor which depends on a number of sub-bitstreams of the video data stream, wherein the video decoder is to decode the video using the spread factor; or the video data stream comprises a clock sub-tick value which depends on a highest sub-bitstream among the sub-bitstreams of the video data stream, wherein the video decoder is to decode the video using the clock sub-tick value.

According to an embodiment, each of the sub-bitstreams depends on an output layer set and/or depends on a sub-layer, and/or depends on a sub-picture.

In an embodiment, a decoding unit removal time depends on an access unit removal time and on the spread factor.

According to an embodiment, the video data stream may, e.g., comprise a temporal distance. The video decoder may, e.g., be configured to multiply the temporal distance by a derived clock sub-tick value. The video decoder may, e.g., be configured to derive the derived clock sub-tick value using the spread factor.

In an embodiment, the spread factor is one of a plurality of spread factors. Each of the plurality of spread factors may, e.g., be assigned to a sublayer of a plurality of sublayers. The video data stream may, e.g., comprise the plurality of spread factors. The video decoder may, e.g., be configured to decode the video using the plurality of spread factors.

According to an embodiment, the clock sub-tick value depends on a clock tick and further depends on the spread factor.

In an embodiment, the clock sub-tick value is defined according to:

$$ClockSubTick == ClockTick \div (\text{tick\_divisor\_minus2} + 2) * (\text{tick\_divisor\_factor\_minus1}[HTid]+1)$$

wherein ClockSubTick is the clock sub-tick value, wherein ClockTick is the clock tick, wherein tick_divisor_minus2 is an additional tick divisor, and wherein tick_divisor_factor_minus1[HTid] indicates the spread factor of the video data stream.

Furthermore, according to an embodiment, a video decoder for receiving a video data stream as an input bitstream, wherein the video data stream has a video encoded thereinto, is provided. The video decoder is to decode the video data stream to decode the video. The video data stream comprises sub-layer specific frame rate information for a sub-layer, and/or wherein the video data stream comprises sub-layer specific frame display duration information for the sub-layer. The decoder is to determine a spread factor using the sub-layer specific frame rate information for the sub-layer and/or using the sub-layer specific frame display duration information.

Moreover, according to an embodiment, a system for encoding a video into a video data stream, and for decoding the video is provided. The system comprises a video encoder as described above and a video decoder as described above. The video encoder is to encode the video into the video data stream, such that the video data stream has the video encoded thereinto. The video decoder is to receive the video data stream and to decode the video data stream to decode the video.

Figure 4:
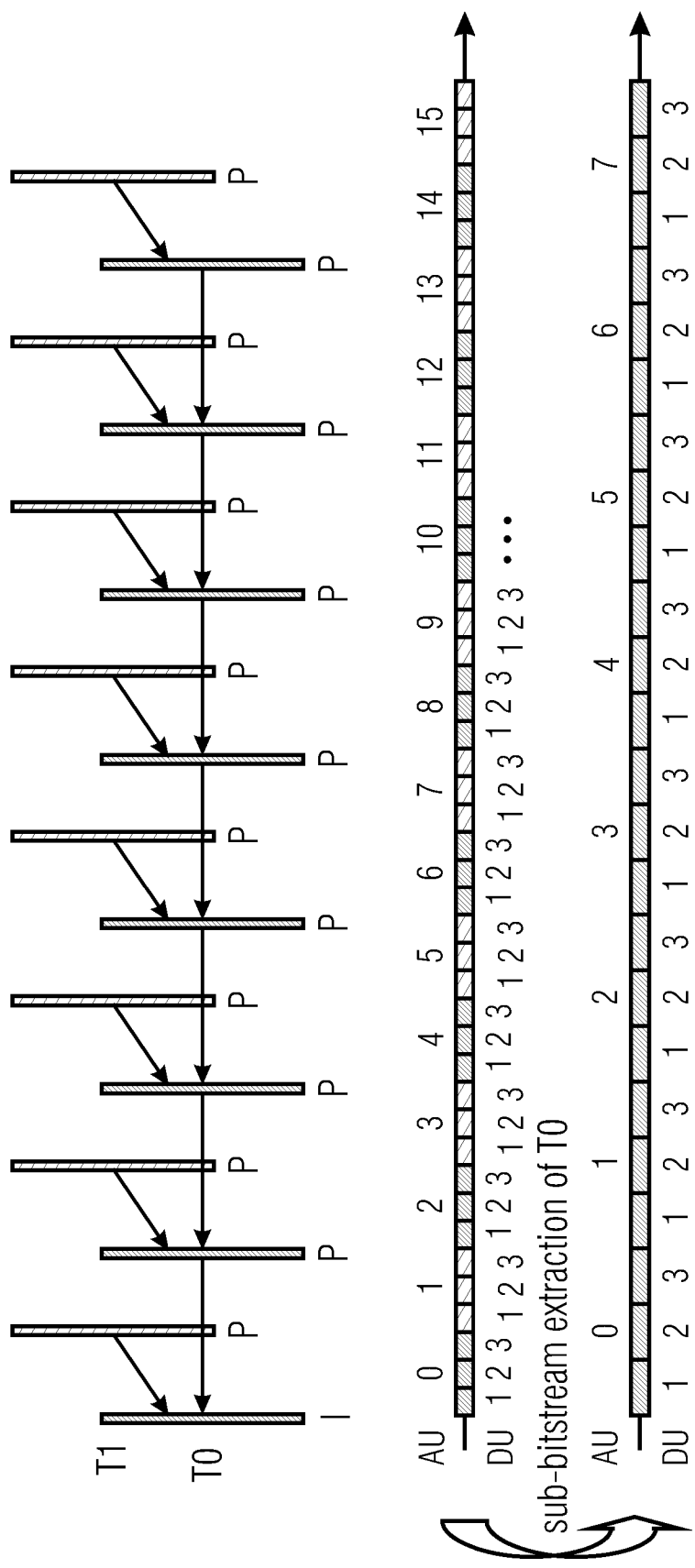
FIG. 4 illustrates a change of removal times for the case that there are three decoding units per access unit.

Removal of temporal sub-layers changes the removal times of remaining access units of lower temporal sub-layers. In particular, when there is reordering of frames. However, in low delay configurations and more in particular when DU timings are provided the removal times are changed in very structured manner, i.e. they are modified as such as the result is a scaling or spreading the decoding times over time. FIG. 4 provides an illustration of the issue for the case that there are 3 DUs per Access unit.

Note that the property of ultra-low delay is lost since the final decoding time of the AUs when the whole bitstream is decoded are different from the case where are only a sub-stream thereof. Typically, this is the consequence of having different decoding capabilities, i.e. a decoder capable of decoding 60 fps can process a frame in ⅟60 seconds, while a decoder being capable of decoding 30 fps can process a frame only in ⅟30 seconds.

Note that the DU removal times are indicated as deltas to the AU removal time. A deltaTime is signaled in the picture timing SEI message or Decoding Unit Information SEI message in number of Clock SubTicks. This deltaTime is indicating the removal time of the DU compared to the AU removal time. Instead of having a loop over multiple temporal sub-layers to indicate the DU removal times (as deltaTimes compared to AU removal time) from the CPB a spread factor could be derived. In one embodiment, the spread factor is derived from sub-layer specific frame rate information (e.g. sub-layer T0 30 fps, sub-layer L1 60 fps) or sub-layer specific frame display duration (FrameTimeInterval explained below in Section 6, e.g. sub-layer L0 ⅟30 s and sub-layer L1 ⅟60 s), e.g. depending on the ratios of such information of two such sub-layers.

Alternatively, such a spread factor could be indicated. The embodiment is to add information of DU removal times that indicates the spread factor to compute the corresponding DU times as a delta to the AU removal time.

Either as indicated in the following:

| | Descriptor |
|---|---|
| general_hrd_parameters( firstSubLayer, maxNumSubLayersMinus1 ) { | |
|   general_nal_hrd_parameters_present_flag | u(1) |
|   general_vcl_hrd_parameters_present_flag | u(1) |
|   [ ... ] | |
|   if( !low_delay_hrd_flag[ i ] ) | |
|     hrd_cpb_cnt_minus1[ i ] | ue(v) |
|   if( decoding_unit_hrd_params_present_flag && | |
|     i != maxNumSubLayersMinus1) | |
|     tick_divisor_factor_minus1[ i ] | u(8) |
|   if( general_nal_hrd_parameters_present_flag ) | |
|     sub_layer_hrd_parameters( i ) | |
|   if( general_vcl_hrd_parameters_present_flag ) | |
|     sub_layer_hrd_parameters( i ) | |
|   } | |
| } | |

Or, as an alternative embodiment, the following:

| | Descriptor |
|---|---|
| sub_layer_hrd_parameters( subLayerId ) { | |
|   for( j = 0; j <= hrd_cpb_cnt_minus1[ subLayerId ]; j++ ) { | |
|     bit_rate_value_minus1[ subLayerId ][ j ] | ue(v) |
|     cpb_size_value_minus1[ subLayerId ][ j ] | ue(v) |
|     if( decoding_unit_hrd_params_present_flag ) { | |
|       cpb_size_du_value_minus1[ subLayerId ][ j ] | ue(v) |
|       bit_rate_du_value_minus1[ subLayerId ][ j ] | ue(v) |
|     } | |
|     cbr_flag[ subLayerId ] [ j ] | u(1) |
|   } | |
|   if( decoding_unit_hrd_params_present_flag && subLayerId != maxNumSubLayersMinus1) | |
|     tick_divisor_factor_minus1[ subLayerId ] | u(8) |
| } | |

The derivation of the associated variable ClockSubTick in the HRD specification would be changed according to the following:

> The variable ClockSubTick is derived as follows and is called a clock sub-tick:
> ClockSubTick = ClockTick ÷ ( tick_divisor_minus2 + 2 ) * ( tick_divisor_factor_minus1[ HTid ] + 1 ) (C-2)

Then the deltaTime is using a ClockSubTick that is bigger or smaller depending on which is the highest sub-layer present in the bitstream.

Alternatively, the syntax element tick_divisor_minus2 could be replicated per sublayer indicating the correct tick divisor when highest temporal sublayer (HTid) is set equal to the respective sublayer. In that case there would not be a spread factor but multiple ClockSubTicks would be signaled, each for a different value of the highest sub-layer present in the bitstream so that when a sub-layer is removed from the original bitstream, the ClockSubTick used is a different one.

In the following, the relevance for OLS extraction when common DU timing is used is explained.

In the case that a bitstream contains extractable sub-bitstream specific to an OLS and common DU timings (non-scalable nested PT SEI messages containing the common DU timing), it is desirable to re-use those PT SEI messages in a manner comparative to the above indications (use_orig_pic_timing_flag and same_pic_timing_withi- n_ols_flag) instead of providing scalable nested PT SEI messages as substitute from perspective of bitrate overhead and processing complexity.

Figure 5:
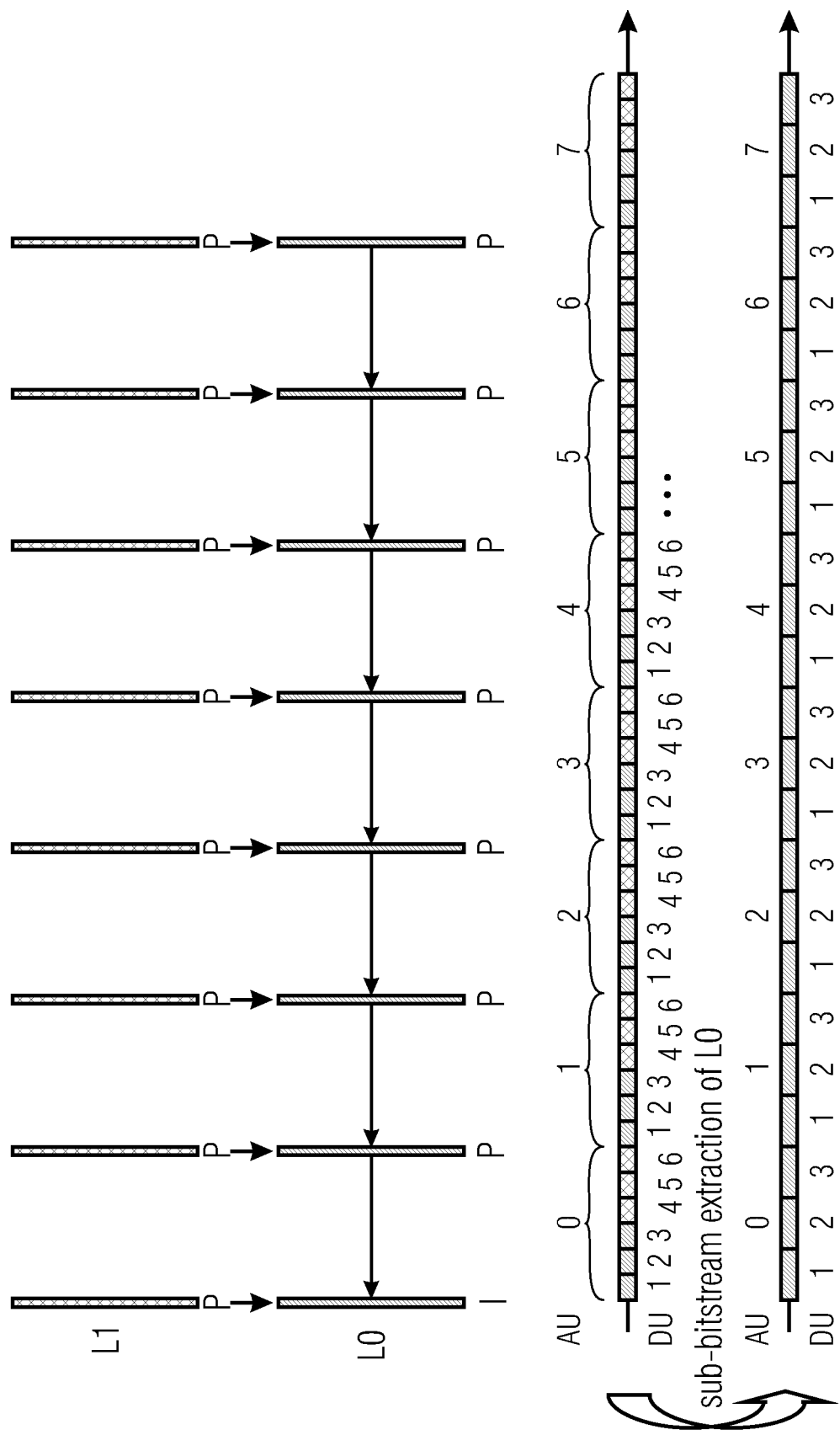
FIG. 5 illustrates two layers and the removal times of access units and decoding units of both layers.

FIG. 5 is an illustration wherein two layers are depicted in the top and the removal times of AUs and DUs of both layers are shown in the bottom for the complete bitstream (e.g. 0-th OLS) and extracted single layer with layer ID L0 (e.g. 1st OLS).

In this case, the common timings need to be scaled in the same way as above by tick_divisor_factor_minus1[ ] or an absolute indication of the adjusted tick divisor (see spreading of DU times in the figure). Therefore, in one embodiment, each OLS-specific HRD parameter syntax structure in the VPS carries either said relative factor or an absolute value of tick divisor in order to scale the common DU removal timings.

However, in this usage scenario, an AU contains both picture of L0 and L1 and therefore the number of DUs per AU changes with extraction. This means, that it requires also the aspects described later in aspect 6 in order to derive the correct number of remaining DUs after extraction.

In the following, the relevance for sub-picture extraction when common DU timing is used is explained.

In the case that a bitstream contains extractable subpictures (subpicture boundary treatment for motion compensated prediction enabled) and common DU timings (non-scalable nested PT SEI messages containing the common timing), it is likewise desirable to re-use those SEI messages in a manner comparative to the above indications (use_orig_pic_timing_flag and same_pic_timing_within_ols_flag) instead of providing scalable nested PT SEI messages as substitute from perspective of bitrate overhead and processing complexity.

In this case, the common timings need to be scaled in the same way as above by tick_divisor_factor_minus1[ ] or an absolute indication of the adjusted tick devisor in order to derive the correct number of remaining DUs after extraction. Therefore, in one embodiment, a subpicture-specific HRD parameter syntax structure in the VPS/SPS carries either said relative factor or an absolute value of tick devisor in order to scale the common DU removal timings.

Alternatively, an SEI message (e.g., subpicture level information SEI message) carries the scaling information or absolute value so that the HRD parameter in the extracted sub-bitstream can be properly derived.

In the following, CPB/Bitrate size derivation for subpictures is described.

According to an embodiment, a video decoder for receiving a video data stream as an input bitstream, wherein the video data stream has a video encoded thereinto, is provided. The video decoder is to decode the video data stream to decode the video. To decode the video, the video decoder is to estimate a coded picture buffer size for a subpicture depending on information within the video data stream indicating a current coded picture buffer size information.

According to an embodiment, the video data stream may, e.g., comprise a signalled coded picture buffer size for a reference level.

In an embodiment, if a current level is equal to a reference level, the video decoder may, e.g., be configured to determine the coded picture buffer size using the coded picture buffer size for the reference level.

According to an embodiment, the video decoder may, e.g., be configured to estimate the coded picture buffer size depending on a syntax element cpb_size_value_minus1[i][j] of the video data stream.

In an embodiment, the video decoder may, e.g., be configured to estimate the coded picture buffer size depending on a syntax element cpb_size_scale of the video data stream.

According to an embodiment, the video decoder may, e.g., be configured to estimate the coded picture buffer size for the subpicture being a video coding layer coded picture buffer size, and may, e.g., be to estimate a further coded picture buffer size for the subpicture being a network abstraction layer coded picture buffer size.

In an embodiment, the video decoder may, e.g., be configured to estimate the video coding layer coded picture buffer size and/or the network abstraction layer coded picture buffer size depending on a reference level fraction value.

According to an embodiment, the video decoder may, e.g., be configured to estimate the video coding layer coded picture buffer size according to:

$$SubPicCbpSizeVcl[s] == $$
$$\text{Floor}\left((\text{cpb\_size\_value\_minus1}[i][j] + 1) * 2^{(4+cpb\_size\_scale)} * RefLevelFraction[i][j] \div 256\right)$$

wherein the apparatus may, e.g., be configured to estimate the network abstraction layer coded picture buffer size according to:

$$SubPicCbpSizeNal[s] == $$
$$\text{Floor}\left((\text{cpb\_size\_value\_minus1}[i][j] + 1) * 2^{(4+cpb\_size\_scale)} * RefLevelFraction[i][j] \div 256\right),$$

wherein RefLevelFraction is the reference level fraction value.

In an embodiment, the video decoder may, e.g., be configured to estimate the video coding layer coded picture buffer size according to:

```
SubpicCpbSizeVcl[ i ][ j ][ k ] =
    Floor( CpbVclFactor * MaxCPB *
    OlsRefLevelFraction[ i ][ j ][ k ] ÷ 256)
SubpicCpbSizeNal[ i ][ j ][ k ] =
    Floor( CpbNalFactor * MaxCPB *
    OlsRefLevelFraction[ i ][ j ][ k ] ÷ 256)
``` wherein i and j and k are indices, wherein OlsRefLevelFraction[i][j][k] is a real number.

Moreover, according to an embodiment, a video decoder for receiving a video data stream as an input bitstream, wherein the video data stream has a video encoded thereinto, is provided. The video decoder is to decode the video data stream to decode the video. To decode the video, the video decoder is to estimate a bitrate for a subpicture depending on information within the video data stream indicating current coded video sequence bitrate information.

According to an embodiment, the video data stream may, e.g., comprise an indication indicating whether or not the bitrate for the subpicture shall be estimated using the current coded video sequence bitrate information. If the indication of the video data stream indicates that the bitrate for the subpicture shall be estimated using the current coded video sequence bitrate information, the video decoder estimates the bitrate using the current coded video sequence bitrate information. If the indication of the video data stream indicates that the bitrate for the subpicture shall be estimated without using the current coded video sequence bitrate information, the video decoder estimates the bitrate using a predefined value or a worst-case value without using the current coded video sequence bitrate information.

In an embodiment, the current coded video sequence bitrate information is a signalled bitrate for a reference level. The video data stream may, e.g., comprise the signalled bitrate for the reference level. If a current level is equal to the reference level, the video decoder may, e.g., be configured to determine the bitrate for the subpicture using the signalled bitrate for the reference level.

According to an embodiment, the video decoder may, e.g., be configured to estimate the bitrate for the subpicture depending on a syntax element bit_rate_value_minus1[i][j] of the video data stream.

In an embodiment, the video decoder may, e.g., be configured to estimate the bitrate for the subpicture depending on a syntax element bit_rate_scale of the video data stream.

According to an embodiment, the video decoder may, e.g., be configured to estimate the bitrate for the subpicture being a video coding layer bitrate for the subpicture, and may, e.g., be to estimate a further coded picture buffer size for the subpicture being a network abstraction layer bitrate for the subpicture.

In an embodiment, the video decoder may, e.g., be configured to estimate the video coding layer coded picture buffer size and/or the network abstraction layer coded picture buffer size depending on a reference level fraction value.

According to an embodiment, the video decoder may, e.g., be configured to estimate the video coding layer bitrate for the subpicture according to:

$$SubPicBitRateVcl[s] == $$
$$\text{Floor}\left((\text{bit\_rate\_value\_minus1}[i][j] + 1) * 2^{(6+bit\_rate\_scale)} * RefLevelFraction[i][j] \div 256\right)$$

wherein the apparatus may, e.g., be configured to estimate the network abstraction layer bitrate for the subpicture according to:

$$SubPicBitRateNal[s] == $$
$$\text{Floor}\left((\text{bit\_rate\_value\_minus1}[i][j] + 1) * 2^{(6+bit\_rate\_scale)} * RefLevelFraction[i][j] \div 256\right),$$

wherein RefLevelFraction is the reference level fraction value.

In an embodiment, the video decoder may, e.g., be configured to estimate the video coding layer bitrate for the subpicture according to:

```
SubpicBitRateVcl[ i ][ j ][ k ] =
    Floor( CpbVclFactor * ValBR *
    OlsRefLevelFraction[ 0 ][ j ][ k ] ÷ 256)
SubpicBitRateNal[ i ][ j ][ k ] =
    Floor( CpbNalFactor * ValBR *
    OlsRefLevelFraction[ 0 ][ j ][ k ] ÷ 256)
``` wherein i and j and k are indices, wherein OlsRefLevelFraction[0][j][k] is a real number.

In an embodiment, i may, e.g., indicate an index of a particular indicated reference level, j may e.g., indicate an index of a particular subpicture of the pictures of an access unit in the video data stream, and k may, e.g., indicate an index of a maximum temporal sublayer that the video data stream includes and/or that the video decoder operates on.

According to an embodiment, OlsRefLevelFraction[i][j][k] may, e.g., depend on a variable sli_non_subpic_layers_fraction[i][k] which indicates an i-th fraction of bitstream level limits associated with layers in targetCvss that have sps_num_subpics_minus1 equal to 0 when Htid is equal to k.

In an embodiment,
if vps_max_layers_minus1 is equal to 0 or when no layer in the bitstream has sps_num_subpics_minus1 equal to 0, then
e.g., sli_non_subpic_layers_fraction[i][k]=0, and
if k is less than sli_max_sublayers_minus1 and sli_non_subpic_layers_fraction[i][k] is not present, the
e.g., sli_non_subpic_layers_fraction[i][k]=sli_non_subpic_layers_fraction[i][k+1].

According to an embodiment, for example, $$OlsRefLevelFraction[i][j][k] == \\ sli\_non\_subpic\_layers\_fraction[i][k] + \\ (n - sli\_non\_subpic\_layers\_fraction[i][k]) \div n * \\ (sli\_ref\_level\_fraction\_minus1[i][j][k] + 1).$$

wherein n indicates a positive integer number.

According to an embodiment, for example, n=256; or n=128; or n=512; or n=1024; or n=2048; or n=4096.

According to an embodiment, the i, j and k are defined depending on sli_ref_level_fraction_minus1, wherein sli_ref_level_fraction_minus1[i][j][k] plus 1 specifies an i-th fraction of level limits, associated with sli_ref_level_idc[i][k], for the subpictures with subpicture index equal to j in layers in targetCvss that have sps_num_subpics_minus1 greater than 0 when Htid, being a considered sublayer index, is equal to k.

Furthermore, according to an embodiment, a video decoder for receiving a video data stream as an input bitstream, wherein the video data stream has a video encoded thereinto, is provided. The video decoder is to decode the video data stream to decode the video. To decode the video, the video decoder is to receive a coded picture buffer size for a subpicture being encoded within the video data stream, and is to use the coded picture buffer size for the subpicture to decode the video; and/or to decode the video, the video decoder is to receive a bitrate for a subpicture being encoded within the video data stream, and is to use the bitrate for the subpicture to decode the video.

According to an embodiment, the video data stream may, e.g., comprise an indication indicating whether or not the coded picture buffer size for the subpicture is encoded within the video data stream or whether the coded picture buffer size for the subpicture shall be estimated. If the indication of the video data stream indicates that the coded picture buffer size for the subpicture shall be estimated, the video decoder estimates the coded picture buffer size for the subpicture. If the indication of the video data stream indicates that the coded picture buffer size for the subpicture is encoded within the video data stream, the video decoder uses the coded picture buffer size for the subpicture encoded within the video data stream.

In an embodiment, the video data stream may, e.g., comprise an indication indicating whether or not the bitrate for the subpicture is encoded within the video data stream or whether the bitrate for the subpicture shall be estimated. If the indication of the video data stream indicates that the bitrate for the subpicture shall be estimated, the video decoder estimates the bitrate for the subpicture. If the indication of the video data stream indicates that the bitrate for the subpicture is encoded within the video data stream, the video decoder uses the coded picture buffer size for the subpicture encoded within the video data stream.

According to an embodiment, each of a plurality of extractable sub-bitstreams are specific to an output layer set, wherein the subpicture is assigned to at least one extractable sub-bitstream of the plurality of extractable sub-bitstreams. If the video data stream may, e.g., comprise common decoding unit removal timing information and the plurality of extractable sub-bitstreams, each output layer set-specific hypothetical reference decoder parameter syntax structure in a video parameter set or in a sequence parameter set or in a supplemental enhancement information message of the video data stream may, e.g., comprise either a spread factor or an absolute value of a tick divisor for scaling the common decoding unit removal timings. The video decoder may, e.g., be configured to process the spread factor or the absolute value of the tick divisor.

Moreover, according to an embodiment, a video data stream having a video encoded thereinto, is provided. The video data stream may, e.g., comprise a syntax element cpb_size_value_minus1[i][j] and a syntax element cpb_size_scale. Or, the video data stream may, e.g., comprise a syntax element bit_rate_value_minus1[i][j] and a syntax element bit_rate_scale.

Furthermore, according to an embodiment, a video data stream having a video encoded thereinto, is provided. The video data stream comprises an indication indicating whether or not a coded picture buffer size for a subpicture shall be estimated using current coded picture buffer size information, and/or the video data stream comprises an indication indicating whether or not a bitrate for a subpicture shall be estimated using current coded video sequence bitrate information.

According to an embodiment, the current coded picture buffer size information is a signalled coded picture buffer size for a reference level, wherein the video data stream may, e.g., comprise the signalled coded picture buffer size for the reference level; and/or the current coded video sequence bitrate information is a signalled bitrate for a reference level, wherein the video data stream may, e.g., comprise the signalled bitrate for the reference level.

Moreover, according to an embodiment, a video data stream having a video encoded thereinto, is provided. The video data stream comprises an indication indicating whether or not a coded picture buffer size for a subpicture is encoded within the video data stream or whether the coded picture buffer size for the subpicture shall be estimated, and/or the video data stream comprises an indication indicating whether or not a bitrate for the subpicture is encoded within the video data stream or whether the bitrate for the subpicture shall be estimated.

According to an embodiment, each of a plurality of extractable sub-bitstreams are specific to an output layer set, wherein the subpicture is assigned to at least one extractable sub-bitstream of the plurality of extractable sub-bitstreams.

If the video data stream may, e.g., comprise common decoding unit removal timing information and the plurality of extractable sub-bitstreams, each output layer set-specific hypothetical reference decoder parameter syntax structure in a video parameter set or in a sequence parameter set or in a supplemental enhancement information message of the video data stream may, e.g., comprise either a spread factor or an absolute value of a tick divisor for scaling the common decoding unit removal timings.

Furthermore, according to an embodiment, a video encoder for encoding a video into a video data stream, such that the video data stream has the video encoded thereinto, is provided. The video encoder is to generate the video data stream such that the video data stream may, e.g., comprise a syntax element cpb_size_value_minus1[i][j] and a syntax element cpb_size_scale. Or, the video encoder is to generate the video data stream such that the video data stream may, e.g., comprise a syntax element bit_rate_value_minus1[i][j] and a syntax element bit_rate_scale.

Moreover, according to an embodiment, a video encoder for encoding a video into a video data stream, such that the video data stream has the video encoded thereinto, is provided. The video encoder is to generate the video data stream such that the video data stream comprises an indication indicating whether or not a coded picture buffer size for a subpicture shall be estimated using current coded picture buffer size information, and/or the video encoder is to generate the video data stream such that the video data stream comprises an indication indicating whether or not a bitrate for a subpicture shall be estimated using current coded video sequence bitrate information.

According to an embodiment, the video encoder may, e.g., be configured to generate the video data stream such that the current coded picture buffer size information is a signalled coded picture buffer size for a reference level, wherein the video data stream may, e.g., comprise the signalled coded picture buffer size for the reference level; and/or the video encoder may, e.g., be configured to generate the video data stream such that the current coded video sequence bitrate information is a signalled bitrate for a reference level, wherein the video data stream may, e.g., comprise the signalled bitrate for the reference level.

Furthermore, according to an embodiment, a video encoder for encoding a video into a video data stream, such that the video data stream has the video encoded thereinto, is provided. The video encoder is to generate the video data stream such that the video data stream comprises an indication indicating whether or not a coded picture buffer size for a subpicture is encoded within the video data stream or whether the coded picture buffer size for the subpicture shall be estimated, and/or the video encoder is to generate the video data stream such that the video data stream comprises an indication indicating whether or not a bitrate for the subpicture is encoded within the video data stream or whether the bitrate for the subpicture shall be estimated.

Moreover, according to an embodiment, a video encoder for encoding a video into a video data stream, such that the video data stream has the video encoded thereinto, is provided. The video encoder is to generate the video data stream such that, if the video data stream comprises common decoding unit removal timing information and a plurality of extractable sub-bitstreams, each of the plurality of sub-bitstreams being specific to an output layer set, each output layer set-specific hypothetical reference decoder parameter syntax structure in a video parameter set or in a sequence parameter set or in a supplemental enhancement information message of the video data stream comprises either a spread factor or an absolute value of a tick divisor for scaling the common decoding unit removal timings.

Moreover, according to an embodiment, a system for encoding a video into a video data stream, and for decoding the video is provided. The system comprises a video encoder as described above and a video decoder as described above. The video encoder may, e.g., be configured to encode the video into the video data stream, such that the video data stream has the video encoded thereinto. The video decoder may, e.g., be configured to receive the video data stream and to decode the video data stream to decode the video.

The current VVC draft specification contains a SEI message that indicates level information for subpictures and additional information to help estimate the level of a subpicture set. The way this is achieved is by signalling a fraction that a subpicture contributes for a given signalled reference level. Based on the level fraction of each subpicture, the variable CPBsize and Bitrate and subsequently the level of the subpicture bitstream are approximated. Also, the accumulated level fractions are used to derive CBP size and Bitrate of bitstreams that consist of a set of subpictures and also to approximate their level. However, in all these derivations the MaxCPBSize and/or MaxBitrate for a reference level are used which is an issue as most bitstreams may not fully occupy the CPB and the bitrate budget up to the MaxCPBSize and/or MaxBitrate of a given level. When these values are used to approximate a level of the a subpicture bitstream or a merged bitstream of a subpicture set bitstream, the (accumulated) CPB sizes and Bitrates are most likely overprovisioned.

The VVC draft specification contains derivation of the variables SubPicCpbSizeVcl[i][j] and SubPicCpbSizeNal[i][j] as follows:

SubPicCpbSizeVcl[ i ][ j ] = Floor( CpbVclFactor * MaxCPB * RefLevelFraction[ i ][ j ] ÷ 256)
SubPicCpbSizeNal[ i ][ j ] = Floor( CpbNalFactor * MaxCPB * RefLevelFraction[ i ][ j ] ÷ 256)

Since the original bitstream containing all subpictures may already carry more precise information about the exact CPB size and Bitrate of the bitstream (cpb_size_value_minus1 and cpb_size_scale) instead of only information of the respective maximum values derived by reference from the level of the bitstream. Hence, it is the objective of the present invention that a much more accurate value for the respective values of CBP size and Bitrate per subpicture can be derived and used in the approximation in the subpicture set level. In a further embodiment the sub-picture CPB is derived as:

SubPicCbpSizeVcl[ s ]=
 Floor(( cpb_size_value_minus1[ i ][ j ] + 1 ) * $2^{(4 + cpb\_size\_scale)}$ *
 RefLevelFraction[ i ][ j ] ÷ 256)
SubPicCbpSizeNal[ s ]
= Floor(( cpb_size_value_minus1[ i ][ j ] + 1 ) * $2^{(4 + cpb\_size\_scale)}$ *
 RefLevelFraction[ i ][ j ] ÷ 256)

Note that the syntax element cpb_size_value_minus1[i][j] is submitted separately for the Vcl and Nal HRD parameters and respectively used in the derivation above. Hence, the value of SubPicCbpSizeVcl[s] and SubPicCbpSizeVcl[s] are derived to potentially different values.

Since the CPB sizes are signalled for a given level, the derivation above can be only performed if that level is included as a reference level.

For bitrates, the respective derivation is changed from using the maximum bitrate as a reference (Br[Vcl/Nal] Factor*MaxBR) as below

```
SubPicBitRateVcl[ s ]= Floor( BrVclFactor * MaxBR *
RefLevelFraction[ i ][ j ] ÷ 256)
SubPicBitRateNal[ s ]= Floor( BrNalFactor * MaxBR *
RefLevelFraction[ i ][ j ] ÷ 256)
``` to using the actual bitrate of the bitstream as signalled $((\text{bit\_rate\_value\_minus1}[i][j]+1)*2^{(6+bit\_rate\_scale)}$ as below

```
SubPicBitRateVcl[ s ]
 = Floor(( bit_rate_value_minus1[ i ][ j ] + 1 ) *
 2^(6 + bit_rate_scale) * RefLevelFraction[ i ][ j ] ÷ 256)
SubPicBitRateNal[ s ]
 = Floor(( bit_rate_value_minus1[ i ][ j ] + 1 ) *
 2^(6 + bit_rate_scale) * RefLevelFraction[ i ][ j ] ÷ 256)
```

Note that here that same applies as above for CPB size and the value of syntax element bit_rate_value_minus1[i][j] depends on whether Nal or Vcl HRD is considered and hence the value of SubBitRateVcl[s] and SubPicBitrateVcl[s] are derived to potentially different values.

In embodiments, the variables SubpicCpbSizeVcl[i][j][k] and SubpicCpbSizeNal[i][j][k] are derived as follows:

```
SubpicCpbSizeVcl[ i ][ j ][ k ] = Floor( CpbVclFactor *
MaxCPB * OlsRefLevelFraction[ i ][ j ][ k ] ÷ 256)
SubpicCpbSizeNal[ i ][ j ][ k ] = Floor( CpbNalFactor *
MaxCPB * OlsRefLevelFraction[ i ][ j ][ k ] ÷ 256)
with MaxCPB derived from sli_ref_level_idc[ i ][ k ]
```

In embodiments, the variables SubpicBitRateVcl[i][j][k] and SubpicBitRateNal[i][j][k] are derived as follows:

```
SubpicBitRateVcl[ i ][ j ][ k ] = Floor( CpbVclFactor *
ValBR * OlsRefLevelFraction[ 0 ][ j ][ k ] ÷ 256)
SubpicBitRateNal[ i ][ j ][ k ] = Floor( CpbNalFactor *
ValBR * OlsRefLevelFraction[ 0 ][ j ][ k ] ÷ 256)
```

E.g., the variable OlsRefLevelFraction[i][j][k] is a number, for example, a real number.

For example, the variable OlsRefLevelFraction[i][j][k] may, e.g., be derived depending on sli_non_subpic_layers_fraction[$i$][$k$]+($n$−sli_non_subpic_layers_fraction[$i$][$k$])÷$n$*(sli_ref_level_fraction_minus1[$i$][$j$][$k$]+1).

wherein n indicates a positive integer number, e.g., n=256; or, e.g., n=128; or, e.g., n=512; or, e.g., n=1024; or, e.g., n=2048; or, e.g., n=4096;

Thus, for example:

$$OlsRefLevelFraction[i][j][k] ==$$
$$\text{sli\_non\_subpic\_layers\_fraction}[i][k] +$$
$$(256 - \text{sli\_non\_subpic\_layers\_fraction}[i][k]) \div 256 *$$
$$(\text{sli\_ref\_level\_fraction\_minus1}[i][j][k] + 1).$$

sli_non_subpic_layers_fraction[i][k] may, e.g., indicate the i-th fraction of the bitstream level limits associated with layers in targetCvss that have sps_num_subpics_minus1 equal to 0 when Htid is equal to k. When vps_max_layers_minus1 is equal to 0 or when no layer in the bitstream has sps_num_subpics_minus1 equal to 0, sli_non_subpic_layers_fraction[i][k] shall be equal to 0. When k is less than sli_max_sublayers_minus1 and sli_non_subpic_layers_fraction[i][k] is not present, it is inferred to be equal to sli_non_subpic_layers_fraction[i][k+1] and sli_ref_level_fraction_minus1[i][j][k] plus 1 specifies the i-th fraction of the level limits, associated with sli_ref_level_idc [i][k], for the subpictures with subpicture index equal to j in layers in targetCvss that have sps_num_subpics_minus1 greater than 0 when Htid is equal to k. When k is less than sli_max_sublayers_minus1 and sli_ref_level_fraction_minus1[i][j][k] is not present, it is inferred to be equal to sli_ref_level_fraction_minus1[i][j][k+1].

Alternatively, in another embodiment the CPB size and/or Bitrate of each sub-picture can be directly signalled instead of derived. Or further, there could be a gating flag that indicates whether the values can be derived or the values are explicitly signalled.

In the following, DU timing signaling in the Picture Timing SEI is described.

According to an embodiment, a video data stream having a video encoded thereinto, is provided. The video data stream comprises a plurality of access units. Furthermore, the video data stream comprises delta time information for each of two or more decoding units of an access unit of the plurality of access units, wherein a decoding unit removal time for each decoding unit of the two or more decoding units of said access unit depends on an access unit removal time for the access unit and depends on the delta time information for said decoding unit.

According to an embodiment, the video data stream may, e.g., comprise a picture timing supplemental enhancement information. The picture timing supplemental enhancement information may, e.g., comprise the delta time information for the two or more decoding units of said access unit.

In an embodiment, the delta time information indicates a removal time difference between two decoding units of the two or more decoding units of said access unit.

According to an embodiment, a last decoding unit among the two or more decoding units of said access unit has a removal time being equal to the removal time of said access unit.

In an embodiment, said access unit may, e.g., comprise three or more decoding units. The removal time difference is equal for each pair of two consecutive decoding units of the three or more decoding units of said access unit.

According to an embodiment, the picture timing supplemental enhancement information applies to a sub-bitstream derived from the video data stream, where a number of decoding units remains constant.

In an embodiment, a frame time interval is signalled in a parameter set of the video data stream, in the HRD parameters in a sequence parameter set.

According to an embodiment, a frame time interval is derivable as a difference in removal times of two consecutive access units at highest temporal level.

In an embodiment, each decoding unit of the two or more decoding units of said access unit may, e.g., comprise one video coding layer network abstraction layer unit.

According to an embodiment, the picture timing supplemental enhancement information applies to a sub-bitstream derived from the video data stream, where a different number of decoding units is present.

In an embodiment, a frame time interval is derivable as (elemental_duration_in_tc_minus1[maxTiD]+1) multiplied by ClockTicks.

According to an embodiment, the video data stream may, e.g., comprise an indication indicating whether or not in a number of decoding units is variable for the video data stream.

In an embodiment, the video data stream does not comprise an indication indicating whether or not in a number of decoding units is variable for the video data stream.

According to an embodiment, the number of decoding units within an access unit depends on a frame time interval and on a common delay increment.

In an embodiment, the video data stream may, e.g., comprise a decoding unit information supplemental enhancement information message for a decoding unit of the two or more decoding units of said access unit. The decoding unit information supplemental enhancement information message for said decoding unit may, e.g., comprise the delta time information for said decoding unit.

According to an embodiment, the video data stream may, e.g., comprise a minimum picture duration flag of a video parameter set or of a sequence parameter set of the video data stream, wherein the minimum picture duration flag indicates whether or not frame time interval information is present when there is no constant framerate.

Moreover, according to an embodiment, a video encoder for encoding a video into a video data stream, such that the video data stream has the video encoded thereinto, is provided. The video encoder is to generate the video data stream such that the video data stream comprises a plurality of access units. Furthermore, the video encoder is to generate the video data stream such that the video data stream comprises delta time information for each of two or more decoding units of an access unit of the plurality of access units, wherein a decoding unit removal time for each decoding unit of the two or more decoding units of said access unit depends on an access unit removal time for the access unit and depends on the delta time information for said decoding unit.

According to an embodiment, the video encoder may, e.g., be configured to generate the video data stream such that the video data stream may, e.g., comprise a picture timing supplemental enhancement information. The video encoder may, e.g., be configured to generate the video data stream such that the picture timing supplemental enhancement information may, e.g., comprise the delta time information for the two or more decoding units of said access unit.

In an embodiment, the video encoder may, e.g., be configured to generate the video data stream such that the delta time information indicates a removal time difference between two decoding units of the two or more decoding units of said access unit.

According to an embodiment, a last decoding unit among the two or more decoding units of said access unit has a removal time being equal to the removal time of said access unit.

In an embodiment, the video encoder may, e.g., be configured to generate the video data stream such that said access unit may, e.g., comprise three or more decoding units. The removal time difference is equal for each pair of two consecutive decoding units of the three or more decoding units of said access unit.

According to an embodiment, the picture timing supplemental enhancement information applies to a sub-bitstream derived from the video data stream, where a number of decoding units remains constant.

In an embodiment, the video encoder may, e.g., be configured to generate the video data stream such that a frame time interval is signalled in a parameter set of the video data stream, in the HRD parameters in a sequence parameter set.

According to an embodiment, the video encoder may, e.g., be configured to generate the video data stream such that a frame time interval is derivable as a difference in removal times of two consecutive access units at highest temporal level.

In an embodiment, the video encoder may, e.g., be configured to generate the video data stream such that each decoding unit of the two or more decoding units of said access unit may, e.g., comprise one video coding layer network abstraction layer unit.

According to an embodiment, the video encoder may, e.g., be configured to generate the video data stream such that the picture timing supplemental enhancement information applies to a sub-bitstream derived from the video data stream, where a different number of decoding units is present.

In an embodiment, a frame time interval is derivable as (elemental_duration_in_tc_minus1[maxTiD]+1) multiplied by ClockTicks.

According to an embodiment, the video encoder may, e.g., be configured to generate the video data stream such that the video data stream may, e.g., comprise an indication indicating whether or not in a number of decoding units is variable for the video data stream.

In an embodiment, the video encoder may, e.g., be configured to generate the video data stream such that the video data stream does not comprise an indication indicating whether or not in a number of decoding units is variable for the video data stream.

According to an embodiment, the video encoder may, e.g., be configured to generate the video data stream such that the number of decoding units within an access unit depends on a frame time interval and on a common delay increment.

In an embodiment, the video encoder may, e.g., be configured to generate the video data stream such that the video data stream may, e.g., comprise a decoding unit information supplemental enhancement information message for a decoding unit of the two or more decoding units of said access unit. The video encoder may, e.g., be configured to generate the video data stream such that the decoding unit information supplemental enhancement information message for said decoding unit may, e.g., comprise the delta time information for said decoding unit.

According to an embodiment, the video data stream may, e.g., comprise a minimum picture duration flag of a video parameter set or of a sequence parameter set of the video data stream, wherein the minimum picture duration flag indicates whether or not frame time interval information is present when there is no constant framerate.

Furthermore, according to an embodiment, a video decoder for receiving a video data stream as an input bitstream, wherein the video data stream has a video encoded thereinto, is provided. The video data stream comprises a plurality of access units. The video decoder is to decode the video data stream to decode the video. Moreover, the video data stream comprises delta time information for each of two or more decoding units of an access unit of the plurality of access units, wherein a decoding unit removal time for each decoding unit of the two or more decoding units of said access unit depends on an access unit removal time for the access unit and depends on the delta time information for said decoding unit, wherein the video decoder is to decode the video data stream using the delta time information for each of two or more decoding units of said access unit.

According to an embodiment, the video data stream may, e.g., comprise a picture timing supplemental enhancement information. The picture timing supplemental enhancement information may, e.g., comprise the delta time information for the two or more decoding units of said access unit.

In an embodiment, the delta time information indicates a removal time difference between two decoding units of the two or more decoding units of said access unit, wherein the video decoder may, e.g., be configured to decode the video data stream using the removal time difference between said two decoding units.

According to an embodiment, a last decoding unit among the two or more decoding units of said access unit has a removal time being equal to the removal time of said access unit, wherein the video decoder may, e.g., be configured to decode the video data stream using the removal time of said access unit.

In an embodiment, said access unit may, e.g., comprise three or more decoding units. The removal time difference is equal for each pair of two consecutive decoding units of the three or more decoding units of said access unit.

According to an embodiment, the picture timing supplemental enhancement information applies to a sub-bitstream derived from the video data stream, where a number of decoding units remains constant.

In an embodiment, a frame time interval is signalled in a parameter set of the video data stream, in the HRD parameters in a sequence parameter set, wherein the video decoder may, e.g., be configured to decode the video data stream using the frame time interval.

According to an embodiment, a frame time interval is derivable as a difference in removal times of two consecutive access units at highest temporal level, wherein the video decoder may, e.g., be configured to decode the video data stream using the frame time interval.

In an embodiment, each decoding unit of the two or more decoding units of said access unit may, e.g., comprise one video coding layer network abstraction layer unit.

According to an embodiment, the picture timing supplemental enhancement information applies to a sub-bitstream derived from the video data stream, where a different number of decoding units is present.

In an embodiment, the video decoder may, e.g., be configured to derive the frame time interval according to:
(elemental_duration_in_tc_minus1[maxTiD]+1) multiplied by ClockTicks.

According to an embodiment, the video data stream may, e.g., comprise an indication indicating whether or not in a number of decoding units is variable for the video data stream, wherein the video decoder may, e.g., be configured to decode the video data stream by processing the indication.

In an embodiment, the video data stream does not comprise an indication indicating whether or not in a number of decoding units is variable for the video data stream.

According to an embodiment, the number of decoding units within an access unit depends on a frame time interval and on a common delay increment.

In an embodiment, the video data stream may, e.g., comprise a decoding unit information supplemental enhancement information message for a decoding unit of the two or more decoding units of said access unit. The decoding unit information supplemental enhancement information message for said decoding unit may, e.g., comprise the delta time information for said decoding unit, wherein the video decoder may, e.g., be configured to decode the video data stream using said delta time information for said decoding unit.

According to an embodiment, the video data stream may, e.g., comprise a minimum picture duration flag of a video parameter set or of a sequence parameter set of the video data stream, wherein the minimum picture duration flag indicates whether or not frame time interval information is present when there is no constant framerate.

Moreover, according to an embodiment, a system for encoding a video into a video data stream, and for decoding the video is provided. The system comprises a video encoder as described above and a video decoder as described above. The video encoder may, e.g., be configured to encode the video into the video data stream, such that the video data stream has the video encoded thereinto. The video decoder may, e.g., be configured to receive the video data stream and to decode the video data stream to decode the video.

As aforementioned, DU timing is given as a delta to the AU timing. More concretely, the removal time of a DU is indicate by giving a delta Time either in the Picture Timing SEI message or in the Decoding Unit Information SEI message that is relative to the removal time of the AU that contains the particular DU.

If the information is included into the picture timing SEI message, the information signalled is the removal time difference between two DUs. The last DU in the AU has a removal time equal to the AU removal time and any other DU is signaled as the difference in removal times to the next DU. There are two options to signal it (highlighted with different colours):

|  | Descriptor |
|---|---|
| pic_timing( payloadSize ) { | |
| ... | |
|   dpb_output_delay | u(v) |
|   if( bp_decoding_unit_hrd_params_present_flag ) | |
|     pic_dpb_output_du_delay | u(v) |
|   if( bp_decoding_unit_hrd_params_present_flag && decoding_unit_cpb_params_in_pic_timing_sei_flag ) { | |
|     num_decoding_units_minus1 | ue(v) |
|     du_common_cpb_removal_delay_flag | u(1) |
|     if( du_common_cpb_removal_delay_flag ) | |
|       for( i = TemporalId; i <= bp_max_sublayers_minus1; i++ ) | |
|         if( pt_sublayer_delays_present_flag[ i ] ) | |
|           du_common_cpb_removal_delay_increment_minus1[ i ] | u(v) |
|     for( i = 0; i <= num_decoding_units_minus1; i++ ) { | |

-continued

| | Descriptor |
|---|---|
|     num_nalus_in_du_minus1[ i ] | ue(v) |
|     if( !du_common_cpb_removal_delay_flag && i < num_decoding_units_minus1 ) | |
|       for( j = TemporalId; j <= bp_max_sublayers_minus1; j++ ) | |
|         if( pt_sublayer_delays_present_flag[ j ] ) | |
|           du_cpb_removal_delay_increment_minus1[ i ][ j ] | u(v) |
|     } | |
|   } | |
|   if( additional_concatenation_info_present_flag ) | |
|     delay_for_concatenation_ensured_flag | u(1) |
| } | |

The first way of signaling it is for the case that the DUs have a same removal time difference which is common to all. The second case is where the removal time differences among DUs within the AU are not the same.

The current syntax in the Picture Timing SEI message when DU timing is present prevents the applicability of the aspect 2 discussed within this invention, since when a sub-bitstream is extracted from the bitstream, the number of DUs could change.

In principle, when the common removal time difference between CUs is the same, it could be possible to enable that even if the number of DUs change the picture timing SEI message still applies. In one embodiment there is a mode in the PT SEI message, where the PT SEI message applies to a sub-bitstream where a different number of DUs is present. The number of DUs is derived from other syntax elements. The PT SEI message is changed as follows:

| | Descriptor |
|---|---|
| pic_timing( payloadSize ) { | |
|   ... | |
|   dpb_output_delay | u(v) |
|   if( bp_decoding_unit_hrd_params_present_flag ) | |
|     pic_dpb_output_du_delay | u(v) |
|   if( bp_decoding_unit_hrd_params_present_flag && | |
|     decoding_unit_cpb_params_in_pic_timing_sei_flag ) { | |
|     du_not_constraint_flag | u(1) |
|     if( du_not_constraint_flag ) { | |
|       num_decoding_units_minus1 | ue(v) |
|       du_common_cpb_removal_delay_flag | u(1) |
|     } | |
|     if( du_common_cpb_removal_delay_flag ) | |
|       for( i = TemporalId; i <= bp_max_sublayers_minus1; i++ ) | |
|         if( pt_sublayer_delays_present_flag[ i ] ) | |
|           du_common_cpb_removal_delay_increment_minus1[ i ] | u(v) |
|     if( du_not_constraint_flag ) { | |
|       for( i = 0; i <= num_decoding_units_minus1; i++ ) { | |
|         num_nalus_in_du_minus1[ i ] | ue(v) |
|         if( !du_common_cpb_removal_delay_flag && i < num_decoding_units_minus1 ) | |
|           for( j = TemporalId; j <= bp_max_sublayers_minus1; j++ ) | |
|             if( pt_sublayer_delays_present_flag[ j ] ) | |
|               du_cpb_removal_delay_increment_minus1[ i ][ j ] | u(v) |
|         } | |
|       } | |
|     } | |
|   if( additional_concatenation_info_present_flag ) | |
|     delay_for_concatenation_ensured_flag | u(1) |
| } | |

If du_not_constraint_flag is equal to 0 the value of du_common_cpb_removal_delay_flag inferred to be 1. The value of num_decoding_units_minus1 is inferred to be equal to FrameTimeInterval divided by (du_common_cpb_removal_delay_increment_minus1+1)*ClockSubTicks minus 1.

FrameTimeInterval could be signaled in a parameter set, in the HRD parameters in SPS, or derived as the difference in removal times of two consecutive access units at highest temporal level.

In this case, there is an additional constraint, that each DU shall contain one VCL NAL unit.

Signalling explicitly the FrameTimeInterval could be done as follows:

|  | Descriptor |
| --- | --- |
| ols_hrd_parameters( firstSubLayer, maxSubLayers ) { | |
|   for( i = firstSubLayer; i <= maxSubLayers; i++ ) { | |
|     fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if(   fixed_pic_rate_within_cvs_flag[ i ]   \|\| | |
|     (( i  ==  maxSubLayers) && min_pic_duration_within_cvs_present_flag ) ) | |
|       elemental_duration_in_tc_minus1[ i ] | ue(v) |
|     else if( hrd_cpb_cnt_minus1 = = 0 ) | |
|       low_delay_hrd_flag[ i ] | u(1) |
|     if( general_nal_hrd_params_present_flag ) | |
|       sublayer_hrd_parameters( i ) | |
|     if( general_vcl_hrd_params_present_flag ) | |
|       sublayer_hrd_parameters( i ) | |
|   } | |
| } | |

Where min_pic_duration_within_cvs_present_flag is a flag in the SPS or VPS that indicates the presence of the FrameTimeInterval when there is no constant framerate. This allows to indicate the FrameTimeInterval in both cases when constant framerate and when not constant frame rate.

In the second case, then du_not_constraint_flag can only be set to 1 if there is a constant framerate. In that case the value of FrameTimeInterval is derived as (elemental_duration_in_tc_minus1[maxTiD]+1) multiplied by ClockTicks.

Alternatively, the additional signaling flag can be omitted by merging the respective indication with the common DU timing mode signaling as follows:

|  | Descriptor |
| --- | --- |
| pic_timing( payloadSize ) { | |
|   ... | |
|   dpb_output_delay | u(v) |
|   if( bp_decoding_unit_hrd_params_present_flag ) | |
|     pic_dpb_output_du_delay | u(v) |
|   if(   bp_decoding_unit_hrd_params_present_flag   && decoding_unit_cpb_params_in_pic_timing_sei_flag ) { | |
|     ~~num_decoding_units_minus1~~ | ~~ue(v)~~ |
|     du_common_cpb_removal_delay_flag | u(1) |
|     if( du_common_cpb_removal_delay_flag ) | |
|       for( i = TemporalId; i <= bp_max_sublayers_minus1; i++ ) | |
|         if( pt_sublayer_delays_present_flag[ i ] ) | |
|           du_common_cpb_removal_delay_increment_minus1[ i ] | u(v) |
|     else { | |
|       num_decoding_units_minus1 | ue(v) |
|       for( i = 0; i <= num_decoding_units_minus1; i++ ) { | |
|         num_nalus_in_du_minus1[ i ] | ue(v) |
|         if( ~~!du_common_cpd_removal_delay_flag &&~~ i < num_decoding_units_minus1 ) | |
|           for( j = TemporalId; j <= bp_max_sublayers_minus1; j++ ) | |
|             if( pt_sublayer_delays_present_flag[ j ] ) | |
|               du_cpb_removal_delay_increment_minus1[ i ][ j ] | u(v) |
|       } | |
|     } | |
|   } | |
|   if( additional_concatenation_info_present_flag ) | |
|     delay_for_concatenation_ensured_flag | u(1) |
| } | |

Note that the derivation of the number of DUs within an AU described above is based on the FrameTimeInterval and the common delay increment, the second given in number of clock-sub-ticks. Note also that in aspect 4, the clock-sub-ticks changes with the temporal sub-layers present in the bitstream. The number of DUs is derived with the clock-sub-ticks for the highest temporal layer or the spread factor discussed in aspect 4 is also taken into account for the FrameTimeInterval so that the same results is achieved.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] ISO/IEC, ITU-T. High efficiency video coding. ITU-T Recommendation H.265|ISO/IEC 23008 10 (HEVC), edition 1, 2013; edition 2, 2014.

The invention claimed is:

1. A method for decoding a picture from a bitstream, the method comprising:
   decoding a first syntax element indicating a bit rate value and a second syntax element indicating a bit rate scale;
   determining a bitrate for the bitstream by: (First Syntax Element+1)*$2^{(6+Second\ Syntax\ Element)}$;
   decoding a subpicture level information (SLI) supplemental enhancement information (SEI) message indicating a fraction of a reference level corresponding to a subpicture of the picture; and
   determining a bit rate of a subpicture bitstream based on multiplying the fraction with the bitrate for the bitstream, and a right shift.

2. The method of claim 1, further comprising:
   decoding, from the SLI SEI message, a third syntax element indicating a level to which a subpicture sequence confirms; and
   determining a coded picture buffer size based on the fraction and the third syntax element.

3. The method of claim 1, wherein:
   the first and second syntax elements are associated with a bit rate of the picture;
   the subpicture includes multiple slices; and
   a value of the first syntax element depends on a network abstraction layer (NAL) or video coding layer (VCL) of the subpicture.

4. The method of claim 1, where determining the fraction, comprises:
   decoding, from the SLI SEI message, a third syntax element indicating reference level fraction value; and
   determining the fraction based on the third syntax element.

5. The method of claim 1, wherein the bit rate of the subpicture is represented as:
   bit rate of the subpicture=Floor(actual bit rate*fraction of a reference level÷256).

6. An electronic device for decoding a picture from a bitstream, the electronic device comprising:
   a processor configured to:
      decode a first syntax element indicating a bit rate value and a second syntax element indicating a bit rate scale;
      determine a bitrate for the bitstream by: (First Syntax Element+1)*$2^{(6+Second\ Syntax\ Element)}$;
      decode a subpicture level information (SLI) supplemental enhancement information (SEI) message indicating a fraction of a reference level corresponding to a subpicture of the picture; and
      determine a bit rate of a subpicture bitstream based on multiplying the fraction with the bitrate for the bitstream, and a right shift.

7. The electronic device of claim 6, wherein the processor is further configured to:
   decode, from the SLI SEI message, a third syntax element indicating a level to which a subpicture sequence confirms; and
   determine a coded picture buffer size based on the fraction and the third syntax element.

8. The electronic device of claim 6, wherein:
   the first and second syntax elements are associated with a bit rate of the picture;
   the subpicture includes multiple slices; and
   a value of the first syntax element depends on a network abstraction layer (NAL) or video coding layer (VCL) of the subpicture.

9. The electronic device of claim 6, where to determine the fraction the processor is configured to:
   decode, from the SLI SEI message, a third syntax element indicating reference level fraction value; and
   determine the fraction based on the third syntax element.

10. The electronic device of claim 6, wherein the bit rate of the subpicture is represented as:
   bit rate of the subpicture=Floor(actual bit rate*fraction of a reference level÷256).

11. A non-transitory computer-readable medium storing instructions that, when executed by a processor of an electronic device for decoding a picture from a bitstream, cause the electronic device to:
- decode a first syntax element indicating a bit rate value and a second syntax element indicating a bit rate scale;
- determine a bitrate for the bitstream by: (First Syntax Element+1)*$2^{(6+Second\ Syntax\ Element)}$;
- decode a subpicture level information (SLI) supplemental enhancement information (SEI) message indicating a fraction of a reference level corresponding to a subpicture of the picture; and
- determine a bit rate of a subpicture bitstream based on multiplying the fraction with the bitrate for the bitstream, and a right shift.

12. The non-transitory computer readable medium of claim 11, further containing instructions that when executed cause the processor:
- decode, from the SLI SEI message, a third syntax element indicating a level to which a subpicture sequence confirms; and
- determine a coded picture buffer size based on the fraction and the third syntax element.

13. The non-transitory computer readable medium of claim 11, wherein:
- the first and second syntax elements are associated with a bit rate of the picture;
- the subpicture includes multiple slices; and
- a value of the first syntax element depends on a network abstraction layer (NAL) or video coding layer (VCL) of the subpicture.

14. The non-transitory computer readable medium of claim 11, where the instructions that when executed cause the processor to determine the fraction, comprise instructions that when executed cause the processor to:
- decode, from the SLI SEI message, a third syntax element indicating reference level fraction value; and
- determine the fraction based on the third syntax element.

15. A method for encoding a picture, the method comprising:
- encoding a first syntax element indicating a bit rate value of the picture and a second syntax element indicating a bit rate scale of the picture, wherein the first and second syntax elements indicate a bitrate for a bitstream represented by: (First Syntax Element+1)*$2^{(6+Second\ Syntax\ Element)}$;
- determining a fraction of a reference level corresponding to a subpicture of the picture;
- determining a bit rate of a subpicture bitstream based on multiplying the fraction with the bitrate and a right shift; and
- encoding the fraction using a subpicture level information (SLI) supplemental enhancement information (SEI) message for indicating the bit rate of the subpicture bitstream.

16. An electronic device for encoding a picture, the electronic device comprising:
a processor configured to:
- encode a first syntax element indicating a bit rate value of the picture and a second syntax element indicating a bit rate scale of the picture, wherein the first and second syntax elements indicate a bitrate for a bitstream represented by: (First Syntax Element+1)*$2^{(6+Second\ Syntax\ Element)}$;
- determine a fraction of a reference level corresponding to a subpicture of the picture;
- determine a bit rate of a subpicture bitstream based on multiplying the fraction with the bitrate and a right shift; and
- encode the fraction using a subpicture level information (SLI) supplemental enhancement information (SEI) message for indicating the bit rate of the subpicture bitstream.

17. A non-transitory computer-readable medium storing instructions that, when executed by a processor of an electronic device for encoding a picture, cause the electronic device to:
- encode a first syntax element indicating a bit rate value of the picture and a second syntax element indicating a bit rate scale of the picture, wherein the first and second syntax elements indicate a bitrate for a bitstream represented by: (First Syntax Element+1)*$2^{(6+Second\ Syntax\ Element)}$;
- determine a fraction of a reference level corresponding to a subpicture of the picture;
- determine a bit rate of a subpicture bitstream based on multiplying the fraction with the bitrate and a right shift; and
- encode the fraction using a subpicture level information (SLI) supplemental enhancement information (SEI) message for indicating the bit rate of the subpicture bitstream.

* * * * *